United States Patent
Yokogi et al.

(10) Patent No.: US 9,006,351 B2
(45) Date of Patent: Apr. 14, 2015

(54) POLYCARBONATE RESIN COMPOSITIONS, AND MOLDED ARTICLES, FILMS, PLATES, AND INJECTION-MOLDED ARTICLES OBTAINED THEREFROM

(71) Applicants: Mitsubishi Chemical Corporation, Chiyoda-ku (JP); Mitsubishi Plastics, Inc., Chiyoda-ku (JP)

(72) Inventors: Masashi Yokogi, Fukuoka (JP); Kazuya Tanaka, Shiga (JP); Haruo Sasaki, Fukuoka (JP); Akira Kosuge, Fukuoka (JP)

(73) Assignees: Mitsubishi Chemical Corporation, Chiyoda-ku (JP); Mitsubishi Plastics, Inc., Chiyoda-ku (JP)

( * ) Notice: Subject to any disclaimer, the term of this patent is extended or adjusted under 35 U.S.C. 154(b) by 129 days.

(21) Appl. No.: 13/740,548

(22) Filed: Jan. 14, 2013

(65) Prior Publication Data

US 2013/0131271 A1    May 23, 2013

Related U.S. Application Data

(63) Continuation of application No. PCT/JP2011/065498, filed on Jul. 6, 2011.

(30) Foreign Application Priority Data

| Jul. 14, 2010 | (JP) | 2010-159743 |
| Aug. 5, 2010 | (JP) | 2010-176390 |
| Dec. 21, 2010 | (JP) | 2010-284457 |
| Mar. 31, 2011 | (JP) | 2011-079417 |

(51) Int. Cl.
| C08L 69/00 | (2006.01) |
| C08G 64/02 | (2006.01) |
| C08G 64/00 | (2006.01) |
| C08L 9/00 | (2006.01) |
| C08L 51/04 | (2006.01) |

(52) U.S. Cl.
CPC ............. *C08L 69/00* (2013.01); *C08G 64/0208* (2013.01); *C08L 9/00* (2013.01); *C08L 51/04* (2013.01)

(58) Field of Classification Search
None
See application file for complete search history.

(56) References Cited

U.S. PATENT DOCUMENTS

| 4,506,066 A | 3/1985 | Medem et al. |
| 2006/0149024 A1 | 7/2006 | Ono et al. |
| 2010/0160563 A1 | 6/2010 | Miyake et al. |
| 2010/0179286 A1 | 7/2010 | Oda et al. |
| 2010/0190953 A1 | 7/2010 | Fuji et al. |
| 2011/0003101 A1 | 1/2011 | Fuji et al. |
| 2012/0245266 A1 | 9/2012 | Yokogi et al. |
| 2012/0328855 A1 | 12/2012 | Yokogi et al. |
| 2013/0075480 A1 | 3/2013 | Yokogi et al. |

FOREIGN PATENT DOCUMENTS

| EP | 2 163 583 A1 | 3/2010 |
| GB | 1079686 | 8/1967 |
| JP | 56-55425 | 5/1981 |
| JP | 63-12896 B2 | 3/1988 |
| JP | 6-145336 | 5/1994 |
| JP | 2007-70438 | 3/2007 |
| JP | 2009-144016 | 7/2009 |
| JP | 2009-161746 | 7/2009 |
| JP | 5434571 | 12/2013 |
| WO | WO 2004/111106 A1 | 12/2004 |
| WO | WO 2007/148604 A1 | 12/2007 |
| WO | WO 2008/146719 A1 | 12/2008 |
| WO | WO 2009/001670 A1 | 12/2008 |
| WO | WO 2009/075304 A1 | 6/2009 |

OTHER PUBLICATIONS

International Search Report issued Oct. 4, 2011 in Application No. PCT/JP2011/065498.
U.S. Appl. No. 14/041,397, filed Sep. 30, 2013, Yokogi, et al.
U.S. Appl. No. 14/041,482, filed Sep. 30, 2013, Sasaki, et al.
U.S. Appl. No. 14/041,883, filed Sep. 30, 2013, Sasaki, et al.
U.S. Appl. No. 13/727,361, filed Sep. 26, 2012, Yokogi, et al.
U.S. Appl. No. 13/970,205, filed Aug. 19, 2013, Yokogi, et al.
U.S. Appl. No. 13/872,750, filed Apr. 29, 2013, Yokogi, et al.
Office Action issued Feb. 25, 2014 in Chinese Patent Application No. 201180034309.7 (with English language translation).
Japanese Office Action issued Jan. 20, 2015 in corresponding Japanese Application No. 2011-150214 w/English translation.

*Primary Examiner* — Terressa Boykin
(74) *Attorney, Agent, or Firm* — Oblon, McClelland, Maier & Neustadt, L.L.P.

(57) ABSTRACT

The invention is to provide a polycarbonate resin composition and a molded polycarbonate resin article which combine excellent transparency and strength and which are suitable for use in the field of building materials, electrical/electronic field, automotive field, field of optical parts, etc. The invention relates to a polycarbonate resin composition containing a polycarbonate resin and an impact strength modifier, the polycarbonate resin containing structural units which are derived from a dihydroxy compound that has the portion represented by the following general formula (1) as part of the structure thereof and having a glass transition temperature lower than 145° C. and a molded polycarbonate resin article obtained by molding the composition. The polycarbonate resin composition gives a molded object having a thickness of 3 mm which has a total light transmittance of 60% or higher.

$$-\!\!\left(\!CH_2\!-\!O\!\right)\!\!- \quad (1)$$

26 Claims, No Drawings

POLYCARBONATE RESIN COMPOSITIONS, AND MOLDED ARTICLES, FILMS, PLATES, AND INJECTION-MOLDED ARTICLES OBTAINED THEREFROM

TECHNICAL FIELD

The present invention relates to polycarbonate resin compositions including a polycarbonate resin and an impact strength modifier and to molded articles, films, plates, and injection-molded articles obtained by molding the compositions.

BACKGROUND ART

Polycarbonates are generally produced using starting materials induced from petroleum resources. In recent years, however, there is a fear about depletion of petroleum resources, and it is desired to supply a polycarbonate produced using a starting material obtained from biomass resources, e.g., plants. Furthermore, since there is a fear about a possibility that the global warming due to the increase in carbon dioxide emission and to the accumulation of carbon dioxide might bring about climate changes, etc., it is desired to develop a polycarbonate which is produced from a plant-derived monomer as a starting material and which is carbon-neutral even when discarded after use.

Hitherto, various polycarbonates produced from plant-derived monomers as starting materials have been developed.

For example, a technique has been proposed in which isosorbide is used as a plant-derived monomer to obtain a polycarbonate through transesterification with diphenyl carbonate (see, for example, patent document 1). A polycarbonate obtained through copolymerization with bisphenol A has been proposed as a copolycarbonate obtained by copolymerizing isosorbide and another dihydroxy compound (see, for example, patent document 2). Furthermore, an attempt has been made to copolymerize isosorbide and an aliphatic diol to thereby mitigate the stiffness of the homo-polycarbonate obtained from isosorbide (see, for example, patent document 3).

Meanwhile, a polycarbonate obtained by polymerizing 1,4-cyclohexanedimethanol, which is an alicyclic dihydroxy compound (see, for example, patent documents 4 and 5) and a polycarbonate produced by adding a rubbery polymer to a polycarbonate obtained by the transesterification of isosorbide with diphenyl carbonate (see, for example, patent document 6) have also been proposed.

Moreover, a polycarbonate produced by adding a styrene-based resin to a polycarbonate obtained by the transesterification of isosorbide with diphenyl carbonate has been proposed (see patent document 7).

PRIOR-ART DOCUMENTS

Patent Documents

Patent Document 1: British Patent No. 1079686, description
Patent Document 2: JP-A-56-55425
Patent Document 3: International Publication No. 2004/111106
Patent Document 4: JP-A-6-145336
Patent Document 5: JP-B-63-12896
Patent Document 6: International Publication No. 2008/146719
Patent Document 7: JP-A-2007-70438

SUMMARY OF THE INVENTION

Problems that the Invention is to Solve

However, the polycarbonate described above which is obtained using isosorbide as a plant-derived monomer through transesterification with diphenyl carbonate is brown and is unsatisfactory from the standpoint of transparency.

The polycarbonate described above that is obtained by polymerizing 1,4-cyclohexanedimethanol, which is an alicyclic dihydroxy compound, has a molecular weight as low as about 4,000 at the most and has a low glass transition temperature in many cases.

Furthermore, the polycarbonate produced by adding a rubbery polymer to a polycarbonate obtained by the transesterification of isosorbide with diphenyl carbonate has a high glass transition temperature. Because of this, when this polycarbonate having a molecular weight which makes the polycarbonate have practical strength is to be obtained, this polycarbonate has too high a melt viscosity. There is hence a problem that not only it is difficult to conduct the polymerization by industrial methods, but also the polycarbonate obtained is insufficient in flowability and is difficult to mold. There also is a problem that when the molding temperature is heightened in order to ensure flowability, this results in troubles such as coloring of the polycarbonate, a decrease in molecular weight thereof, and evolution of a decomposition gas. On the other hand, when the molecular weight is lowered in order to ensure flowability, the product thus obtained is limited to a polycarbonate which is poor in strength, e.g., impact resistance. Even if a rubbery polymer is added thereto, the effect of this addition is limited. Meanwhile, the polycarbonate to which a styrene-based resin has been added is not satisfactory from the standpoint of total light transmittance.

As described above, although various polycarbonate resins produced using starting materials obtained from biomass resources, e.g., plants, have been proposed so far, none of these polycarbonate resins can be satisfactorily usable in fields where the resins are required to combine transparency and strength, such as the field of building materials, electrical/electronic field, automotive field, and field of optical parts.

Especially for use in applications such as transparent covers for switch protection, lighting-type switches for preventing forgetting to switch off, resinous shields, the front screen of a motorcycle, transparent building materials for daylighting, and carport roofing, the polycarbonate resins are required to combine transparency and strength. However, none of the polycarbonate resins which have been obtained so far using starting materials obtained from biomass resources is sufficiently suitable for those applications.

An object of the invention is to eliminate the problems of conventional techniques described above and to provide a polycarbonate resin composition and a molded polycarbonate resin article which combine excellent transparency and strength and are suitable for use in the field of building materials, electrical/electronic field, automotive field, field of optical parts, etc.

Means for Solving the Problems

The present inventors made investigations. As a result, the inventors have found that a polycarbonate resin composition which includes a polycarbonate resin and an impact strength modifier, the polycarbonate resin containing structural units derived from a dihydroxy compound that has a specific portion and having a given glass transition temperature, and which satisfies given properties can be a polycarbonate resin composition that is excellent in terms of transparency and strength and is suitable for use in the field of building materials, electrical/electronic field, automotive field, field of optical parts, etc. A first aspect of the invention has been thus completed.

Essential points of the first aspect of the invention reside in the following [A1] to [A11].

[A1] A polycarbonate resin composition comprising a polycarbonate resin and an impact strength modifier, the polycarbonate resin containing structural units derived from a dihydroxy compound that has the portion represented by the following general formula (1) as part of the structure thereof and having a glass transition temperature lower than 145° C., characterized in that a molded object having a thickness of 3 mm formed from the polycarbonate resin composition has a total light transmittance of 60% or higher.

[Chem. 1]

(The case where the portion represented by the general formula (1) is part of —CH$_2$—O—H is excluded.)

[A2] The polycarbonate resin composition according to [A1] which is characterized in that the content of the impact strength modifier per 100 parts by weight of the polycarbonate resin is 1 part by weight or more but less than 25 parts by weight.

[A3] The polycarbonate resin composition according to [A1] or [A2] which is characterized in that the impact strength modifier is a copolymer which contains butadiene.

[A4] The polycarbonate resin composition according to any one of [A1] to [A3] which is characterized in that the dihydroxy compound having the portion represented by the general formula (1) as part of the structure thereof is a dihydroxy compound having a heterocyclic group.

[A5] The polycarbonate resin composition according to [A4] which is characterized in that the dihydroxy compound having a heterocyclic group is a compound represented by the following general formula (2).

[Chem. 2]

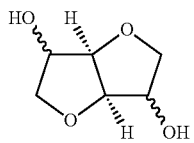

(2)

[A6] The polycarbonate resin composition according to any one of [A1] to [A5] which is characterized in that the content of the structural units derived from a dihydroxy compound having the portion represented by the general formula (1) as part of the structure thereof, in the polycarbonate resin, is 1 mol % or higher but less than 90 mol %.

[A7] The polycarbonate resin composition according to any one of [A1] to [A6] which is characterized in that the polycarbonate resin further contains structural units derived from an aliphatic dihydroxy compound.

[A8] The polycarbonate resin composition according to [A7] which is characterized in that the aliphatic dihydroxy compound is an alicyclic dihydroxy compound.

[A9] The polycarbonate resin composition according to any one of [A1] to [A8] which is characterized in that the content of structural units derived from a bisphenol compound, in the polycarbonate resin, is 0 mol % or higher but less than 1 mol %.

[A10] A molded polycarbonate resin article characterized by being obtained by molding the polycarbonate resin composition according to any one of [A1] to [A9].

[A11] The molded polycarbonate resin article according to [A10] which is characterized by being obtained by molding the composition by injection molding.

According to the first aspect of the invention, it is possible to provide a polycarbonate resin composition and a molded polycarbonate resin article which combine excellent transparency and strength and are suitable for use in the field of building materials, electrical/electronic field, automotive field, field of optical parts, etc.

Meanwhile, the present inventors directed attention to the following problem of the background art described above.

The aromatic polycarbonate resins themselves which have conventionally been used extensively have excellent impact resistance. In contrast, the polycarbonates produced using isosorbide are inferior in impact resistance to the aromatic polycarbonate resins and are require to be improved. In order to overcome this problem, a polycarbonate resin composition which includes a polycarbonate resin having a high glass transition temperature and a rubbery polymer has been proposed as a composition having enhanced impact resistance (see patent document 6, which was cited above).

The polycarbonate resin composition clearly described in patent document 6 contains a polycarbonate resin which is either a homopolymer of isosorbide or a polymer obtained by copolymerizing isosorbide with a small amount of 1,3-propanediol, 1,1-bis(4-hydroxyphenyl)decane, or the like. However, polycarbonate resin compositions which contain such polycarbonate resins were found to have the following problem. Although the impact resistance, i.e., impact resistance value as the value of a general property, of the polycarbonate resins is improved, the effect of improving the sheet impact resistance, i.e., the value of sheet impact resistance which is evaluated as a more practical property, and percent ductile fracture thereof is low. Those polycarbonate resin compositions hence are unsuitable for use in applications such as office automation (OA) appliances, electronic/electrical parts, the housings of parts for precision instruments, and interior or exterior automotive parts.

Accordingly, an object of a second aspect of the invention is to provide a polycarbonate resin composition and a molded article thereof which are excellent in terms of sheet impact resistance, impact resistance, etc.

The present inventors diligently made investigations in order to overcome the problem described above. As a result, the inventors have found that a polycarbonate resin composition which includes a polycarbonate resin having a glass transition temperature (Tig) lower than a given value and having a specific structure and an impact strength modifier having a core/shell structure is excellent in terms of sheet impact resistance, impact resistance, etc. The second aspect of the invention has been thus accomplished.

Essential points of the second aspect of the invention reside in the following [B1] to [B13].

[B1] A polycarbonate resin composition which comprises a polycarbonate resin that contains structural units derived from a dihydroxy compound having the portion represented by the following general formula (1) as part of the structure thereof and that has a glass transition temperature (Tig) lower than 145° C. and an impact strength modifier having a core/shell structure.

[Chem. 3]

(The case where the portion represented by the general formula (1) is part of —CH$_2$—O—H is excluded.)

[B2] The polycarbonate resin composition according to [B1] which contains the impact strength modifier in an amount of 0.05-50 parts by weight per 100 parts by weight of the polycarbonate resin.

[B3] The polycarbonate resin composition according to [B1] or [B2] wherein the polycarbonate resin contains structural units derived from a dihydroxy compound having a cyclic structure.

[B4] The polycarbonate resin composition according to [B3] wherein the polycarbonate resin contains structural units derived from a dihydroxy compound represented by the following formula (2).

[Chem. 4]

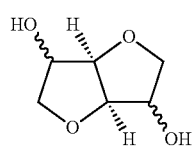

[B5] The polycarbonate resin composition according to any one of [B1] to [B4] wherein the shell layers of the impact strength modifier have been formed from an alkyl(meth)acrylate.

[B6] The polycarbonate resin composition according to [B5] wherein the core layers of the impact strength modifier are constituted of one or more members selected from the group consisting of alkyl acrylates, silicone/acrylic composites, butadiene, and butadiene/styrene copolymers.

[B7] The polycarbonate resin composition according to any one of [B1] to [B6] wherein the polycarbonate resin has a reduced viscosity of 0.4-1.4 dL/g.

[B8] The polycarbonate resin composition according to any one of [B1] to [B7] wherein the polycarbonate resin contains structural units derived from an aliphatic dihydroxy compound.

[B9] The polycarbonate resin composition according to [B8] wherein the polycarbonate resin contains the structural units derived from an aliphatic dihydroxy compound, in an amount of 20 mol % or more based on all structural units each derived from a dihydroxy compound.

[B10] The polycarbonate resin composition according to any one of [B1] to [B9] wherein the polycarbonate resin contains structural units derived from at least one dihydroxy compound selected from the group consisting of dihydroxy compounds having a 5-membered cyclic structure and dihydroxy compounds having a 6-membered cyclic structure.

[B11] The polycarbonate resin composition according to any one of [B1] to [B10] wherein the polycarbonate resin contains structural units derived from at least one dihydroxy compound selected from the group consisting of cyclohexanedimethanols and tetracyclodecanedimethanols.

[B12] A molded polycarbonate resin article obtained by molding the polycarbonate resin composition according to any one of [B1] to [B11].

[B13] The molded polycarbonate resin article according to [B12] which is obtained by injection-molding the polycarbonate resin composition.

According to the second aspect of the invention, it is possible to provide a polycarbonate resin composition and a molded article thereof which are excellent in terms of sheet impact resistance, impact resistance, etc. In preferred embodiments of the polycarbonate resin composition according to the second aspect of the invention, the composition is excellent in terms of various properties including hue, heat resistance, light resistance, moldability, and mechanical strength.

Next, a third aspect of the invention is explained. The third aspect of the invention has been achieved in view of the following background.

Aromatic polycarbonate resins have hitherto been used extensively in various applications, for example, in the fields of motor vehicles and OA appliances, as engineering plastics having excellent heat resistance, impact resistance, and transparency. Meanwhile, although the aromatic polycarbonate resins are generally produced using starting materials induced from petroleum resources, it is desired to supply molded articles of a plastic produced using a starting material obtained from biomass resources such as plants, in view of the recent circumstances in which there is a fear about depletion of petroleum resources. Furthermore, since there is a fear about a possibility that the global warming due to the increase in carbon dioxide emission and to the accumulation of carbon dioxide might bring about climate changes, etc., it is desired to develop materials or parts which are molded plastic articles formed from a plastic that is produced from a plant-derived monomer as a starting material and that is carbon-neutral even when discarded after use. This desire is strong especially in the field of large molded articles.

In order to meet such a desire, a technique has been proposed in patent document 1, which was cited above, in which isosorbide is used as a plant-derived monomer to obtain a polycarbonate through transesterification with diphenyl carbonate. Furthermore, a polycarbonate obtained through copolymerization with bisphenol A has been proposed in patent document 2, which was cited above, as a copolycarbonate obtained by copolymerizing isosorbide and another dihydroxy compound, while an attempt has been made to copolymerize isosorbide and an aliphatic diol to thereby mitigate the stiffness of the homo-polycarbonate obtained from isosorbide, as described in patent document 3, which was cited above. Meanwhile, many polycarbonates obtained through polymerization of 1,4-cyclohexanedimethanol, which is an alicyclic dihydroxy compound, have been proposed in patent document 4 and patent document 5, which were cited above.

Although carbonate polymers produced using isosorbide have been proposed as described above, no such resin that satisfies heat resistance and impact resistance which are required for application to large molded articles has been supplied so far. In addition, the properties disclosed in those documents are limited to glass transition temperature and basic mechanical properties, and the impact resistance which is important for use as the large molded articles is not sufficiently disclosed therein.

In order to overcome such a problem, a resin composition obtained by blending 100 parts by mass of a polycarbonate resin which contains isosorbide with 25-400 parts by mass of an addition polymerization type polymer is disclosed in patent document 7, which was cited above. Furthermore, a resin composition obtained by incorporating 1-30 parts by mass of a rubbery polymer into 100 parts by mass of a polycarbonate resin which contains isosorbide is disclosed in patent document 6, which was cited above.

However, the polycarbonate obtained by the technique disclosed in patent document 1 is brown and does not have an appearance which renders the polycarbonate usable in a wide range of fields. With respect to the techniques disclosed in patent document 2 and patent document 3, the polycarbonates are poor in mechanical strength, in particular, impact resistance, and are hence not sufficiently suitable for use in a wide range of fields. In addition, the polycarbonates disclosed in patent document 4 and patent document 5 have a number-average molecular weight of about 4,000, which is lower than the number-average molecular weights of general aromatic polycarbonate resins, and are mostly poor in impact resistance and heat resistance.

Furthermore, according to the technique disclosed in patent document 7, impact resistance is improved by incorporating an acrylonitrile/butadiene/styrene graft copolymer (hereinafter referred to also as ABS resin) into a polycarbonate which contains isosorbide. However, not only the effect of improving impact resistance is not remarkable but also the incorporation of the ABS resin results in a decrease in transparency. It is therefore difficult to use the polycarbonate in a wide range of fields. In addition, with respect to the technique disclosed in patent document 6, although the effect of improving impact resistance by means of a rubbery polymer is higher than the effect produced with an ABS resin, a decrease in transparency is unavoidable and this polycarbonate is usable only in limited applications like the polycarbonate according to patent document 1.

As described above, it has been exceedingly difficult, with any of the techniques described above, to provide a resin composition which is excellent in terms of all of transparency, heat resistance, and impact resistance.

Accordingly, in view of such a problem, an object of the third aspect of the invention is to provide a resin composition which is excellent in terms of all of transparency, heat resistance, and impact resistance.

An essential point of the third aspect of the invention is as follows.

[C1] A polycarbonate resin composition which comprises as a main component a mixture (X) comprising a polycarbonate resin (A) that contains structural units (a) derived from a dihydroxy compound having the portion represented by the following general formula (1) as part of the structure thereof and structural units (b) derived from an alicyclic dihydroxy compound and an impact strength modifier that comprises a flexible styrene-based resin (B) having a styrene content of 10-40% by mass, characterized in that the proportion of the (B) to the mixture (X) is 1-20% by mass.

[Chem. 5]

(1)

(The case where the portion represented by the general formula (1) is part of —CH$_2$—O—H is excluded.)

According to the third aspect of the invention, it is possible to provide a resin composition which combines transparency, heat resistance, and impact resistance.

MODES FOR CARRYING OUT THE INVENTION

In this description, "% by weight", "weight ppm", and "parts by weight" have the same meanings as "% by mass", "mass ppm", and "parts by mass", respectively.

(First Aspect)

The first aspect of the invention will be explained below in detail. The first aspect of the invention should not be construed as being limited to the following embodiments, and can be variously modified within the scope of the essential points thereof.

<Polycarbonate Resin Composition>

The polycarbonate resin composition includes a polycarbonate resin and an impact strength modifier, the polycarbonate resin containing structural units derived from a dihydroxy compound that has the portion represented by the following general formula (1) as part of the structure thereof (hereinafter often referred to as "dihydroxy compound according to the invention") and having a glass transition temperature lower than 145° C., and a molded object thereof having a thickness of 3 mm has a total light transmittance of 60% or higher.

[Chem. 6]

(1)

However, the case where the portion represented by the general formula (1) is part of —CH$_2$—O—H is excluded. Namely, the dihydroxy compound is a compound which at least contains two hydroxyl groups and further contains the portion of the general formula (1).

In the case where the total light transmittance in the polycarbonate resin composition is less than 60%, there is a possibility that it might be difficult for this polycarbonate resin composition to be suitable for use in the field of building materials, electrical/electronic field, automotive field, field of optical parts, etc. The total light transmittance thereof is preferably 70% or higher, more preferably 80% or higher.

From the standpoint of difficulty in implementation, an upper light of the total light transmittance is 94%.

The total light transmittance can be controlled by regulating the molar proportions of dihydroxy compounds in the polycarbonate resin composition, the kind or content of the impact strength modifier, etc.

Details of the polycarbonate resin composition according to the first aspect of the invention are explained below.

<Dihydroxy Compounds>

The polycarbonate resin composition at least has structural units derived from a dihydroxy compound having the portion represented by the general formula (1) as part of the structure thereof.

In the polycarbonate resin, it is preferred that the content of these structural units should be 1 mol % or higher but less than 90 mol %.

When the content of the structural units is too low and outside the range, there is a possibility that this composition might be insufficient in heat resistance to give molded members which deform thermally. On the other hand, when the content thereof is too high and outside the range, it is difficult to impart a high molecular weight to the polycarbonate resin and, hence, there is a possibility that the composition might be insufficient in impact resistance to give molded members which rupture when used. The content of structural units derived from the dihydroxy compound is more preferably 30 mol % or higher, even more preferably 50 mol % or higher. The content of structural units derived from the dihydroxy compound is more preferably less than 80 mol %, even more preferably less than 70 mol %, especially preferably 65 mol % or less, most preferably 60 mol % or less.

The dihydroxy compound having the portion represented by the general formula (1) as part of the structure thereof (dihydroxy compound according to the invention) is not particularly limited so long as the molecular structure thereof contains, as part thereof, the portion represented by the general formula (1). Specific examples thereof include oxyalkylene glycols such as diethylene glycol, triethylene glycol, and tetraethylene glycol and dihydroxy compounds which have an aromatic group as a side chain and have, in the main chain, ether groups each bonded, as the portion represented by the general formula (1), to an aromatic group, such as 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene.

Examples thereof further include dihydroxy compounds having a heterocyclic group in which a part thereof is the portion represented by the general formula (1), such as anhydrous sugar alcohols represented by dihydroxy compounds represented by the following general formula (2) and compounds having a cyclic ether structure, such as spiro glycols represented by the following general formula (3). Preferred are dihydroxy compounds having a heterocyclic group in which a part thereof is the portion represented by the general formula (1). Examples of the dihydroxy compounds represented by the following general formula (2) include isosorbide, isomannide, and isoidide, which are stereoisomers. Examples of the dihydroxy compounds represented by the following general formula (3) include 3,9-bis(1,1-dimethyl-2-hydroxyethyl)-2,4,8,10-tetraoxaspiro(5.5)undecane (common name, spiro glycol), 3,9-bis(1,1-diethyl-2-hydroxyethyl)-2,4,8,10-tetraoxaspiro(5.5)undecane, 3,9-bis(1,1-dipropyl-2-hydroxyethyl)-2,4,8,10-tetraoxaspiro(5.5)undecane, and dioxane glycol.

One of these compounds may be used alone, or two or more thereof may be used in combination.

More preferred of those dihdyroxy compounds are the compounds having a heterocyclic group, from the standpoint that these compounds can be produced from abundant resources and are easily available. Especially preferred of these are the compounds represented by the following general formula (2). Most preferred is isosorbide from the standpoints of availability, ease of production, optical properties, and moldability. Isosorbide is obtained by the dehydrating condensation of sorbitol, which is produced from various starches.

[Chem. 7]

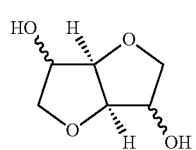

(2)

[Chem. 8]

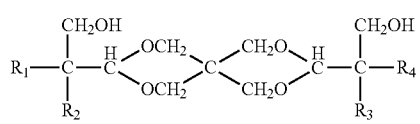

(3)

In the general formula (3), $R_1$ to $R_4$ each independently represent an alkyl group having 1-3 carbon atoms.

Incidentally, dihydroxy compounds having the portion represented by the general formula (1) as part of the structure thereof, such as the dihydroxy compounds represented by isosorbide, are apt to be gradually oxidized by oxygen. It is therefore important to prevent water inclusion during storage or during handling in production in order to prevent decomposition caused by oxygen. It is also important to use a deoxidizer or to employ a nitrogen atmosphere. Upon oxidation, isosorbide generates decomposition products including formic acid. For example, in the case where isosorbide containing those decomposition products is used for producing a polycarbonate resin, the decomposition products are causative of coloring of the polycarbonate resin being obtained or cause a considerable deterioration in the properties thereof. There also are the cases where the decomposition products affect the polymerization reaction to make it impossible to obtain a polymer having a high molecular weight. Consequently, use of such isosorbide is undesirable. In the case where a stabilizer for preventing generation of formic acid has been added, a polycarbonate resin which has taken a color or has considerably deteriorated properties may be obtained, depending on the kind of the stabilizer.

It is therefore preferred to use a stabilizer for the dihydroxy compound according to the invention. As the stabilizer, it is preferred to use a stabilizer such as a reducing agent, antacid, antioxidant, deoxidizer, light stabilizer, pH stabilizer, or heat stabilizer. Since the dihydroxy compound is apt to alter especially under acidic conditions, it is preferred that the dihydroxy compound should contain a basic stabilizer. Examples of the reducing agent among those stabilizers include sodium borohydride and lithium borohydride. Examples of the antacid include alkalis such as sodium hydroxide. When such an alkali metal salt is added, there are the cases where the alkali metal serves as a polymerization catalyst. Consequently, excessive addition thereof renders the polymerization reaction uncontrollable, and is hence undesirable.

Examples of the basic stabilizer include the hydroxides, carbonates, phosphates, phosphites, hypophosphites, borates, and fatty acid salts of Group-1 or Group-2 metals of the long-form periodic table (Nomenclature of Inorganic Chemistry IUPAC Recommendations 2005). Examples thereof further include basic ammonium compounds such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide and amine compounds such as 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline. Of these, the phosphates and phosphites of sodium or potassium are preferred from the standpoints of the effect thereof and the ease of removal thereof by distillation which will be described later. Especially preferred are disodium hydrogen phosphate and disodium hydrogen phosphite.

There are no particular limitations on the content of those basic stabilizers in the dihydroxy compound. In the case where the content thereof is too low, there is a possibility that the effect of preventing the alteration of the dihydroxy compound might not be obtained. When the content thereof is too high, there are the cases where the dihydroxy compound is altered. Consequently, the content of those basic stabilizers is generally 0.0001-1% by weight, preferably 0.001-0.1% by weight, based on the dihydroxy compound.

When the dihydroxy compound which contains those basic stabilizers is used as a starting material for producing a polycarbonate resin, not only the basic stabilizers themselves serve as a polymerization catalyst to make it difficult to control polymerization rate and quality, but also the presence of the basic stabilizers leads to a deterioration in initial hue, resulting in molded polycarbonate resin articles having impaired light resistance. It is therefore preferred that the basic stabilizers should be removed with an ion-exchange resin or by distillation or the like before the dihydroxy compound is used as a starting material for producing a polycarbonate resin.

Especially when the dihydroxy compound is a compound having a cyclic ether structure, e.g., isosorbide, this dihydroxy compound is apt to be gradually oxidized by oxygen. It is therefore important to prevent water inclusion during storage or production in order to prevent decomposition caused by oxygen. It is also important to use a deoxidizer or the like or to handle the dihydroxy compound in a nitrogen atmosphere. There are the cases where isosorbide, upon oxidation, generates decomposition products including formic acid. For example, in the case where isosorbide containing those decomposition products is used as a starting material for producing a polycarbonate resin, there is the possibility of resulting in a colored polycarbonate resin. There also is a possibility that the decomposition products considerably deteriorate the properties of the resin. In addition, there are the cases where the decomposition products affect the polymerization reaction to make it impossible to obtain a polymer having a high molecular weight.

It is preferred to purify the dihydroxy compound by distillation in order to obtain the dihydroxy compound which does not contain the oxidative-decomposition products and to remove the basic stabilizers described above. The distillation in this case may be simple distillation or continuous distillation, and is not particularly limited. With respect to distillation conditions, it is preferred to conduct distillation at a reduced pressure in an inert gas atmosphere such as argon or nitrogen. From the standpoint of inhibiting thermal alteration, it is preferred to conduct the distillation under the conditions of 250° C. or lower, preferably 200° C. or lower, especially 180° C. or lower.

Through such purification by distillation, the content of formic acid in the dihydroxy compound according to the invention is reduced to 20 weight ppm or less, preferably 10 weight ppm or less, especially preferably 5 weight ppm or less. As a result, polymerizability in polycarbonate resin production is not impaired and a polycarbonate resin having an excellent hue and excellent thermal stability can be produced. The content of formic acid is determined using ion chromatography by the following procedure. In the following procedure, isosorbide is used as a representative dihydroxy compound.

About 0.5 g of isosorbide is precisely weighed out and put in a 50-mL measuring flask, and pure water is added thereto to adjust the volume of the solution. An aqueous sodium formate solution is used as a reference sample. The peak which agrees in retention time with the peak for the reference sample is taken as the peak assigned to formic acid, and the amount of formic acid is determined from the area of the peak by the absolute calibration method.

As an ion chromatograph, use was made of Type DX-500, manufactured by Dionex Corp. As a detector, a conductivity detector was used. As measuring columns, use is made of AG-15 and AS-15, both manufactured by Dionex Corp., as a guard column and a separation column, respectively. The sample to be examined is injected into a 100-4, sample loop, and 10-mM NaOH is used as an eluent to conduct analysis at a flow rate of 1.2 mL/min and a thermostatic-chamber temperature of 35° C. As a suppressor is used a membrane suppressor. As a regenerant is used 12.5-mM aqueous $H_2SO_4$ solution.

It is preferred that the polycarbonate resin should contain structural units derived from an aliphatic dihydroxy compound, besides the structural units derived from a dihydroxy compound having the portion represented by the general formula (1) as part of the structure thereof, and that the polycarbonate resin should contain structural units derived from an alicyclic dihydroxy compound, besides the structural units derived from that dihydroxy compound. In this case, flexibility can be imparted.

<Aliphatic Dihydroxy Compound>

Examples of the aliphatic dihydroxy compound include 1,4-butanediol, 1,5-pentanediol, neopentyl glycol, 1,6-hexanediol, 1,7-heptanediol, 1,8-octanediol, 2-ethyl-1,6-hexanediol, 2,2,4-trimethyl-1,6-hexanediol, 1,10-decanediol, hydrogenated dilinoleyl glycol, hydrogenated dioleyl glycol, and the alicyclic dihydroxy compound which will be described below.

<Alicyclic Dihydroxy Compound>

The alicyclic dihydroxy compound is not particularly limited, and examples thereof usually include compounds which contain a 5-membered cyclic structure or 6-membered cyclic structure. When the alicyclic dihydroxy compound has a 5-membered cyclic structure or 6-membered cyclic structure, there is the possibility of yielding a polycarbonate resin which has enhanced heat resistance. The 6-membered cyclic structure may be in a chair or boat form which has been fixed by means of covalent bonding. The number of the carbon atoms contained in the alicyclic dihydroxy compound is generally 70 or less, preferably 50 or less, more preferably 30 or less. In the case where the number of the carbon atoms is excessively large, such an alicyclic dihydroxy compound tends to be difficult to synthesize or purify or tends to have a high cost, although the compound brings about enhanced heat resistance. There is a tendency that the smaller the number of the carbon atoms, the easier the purification or procurement of the alicyclic dihydroxy compound.

Examples of the alicyclic dihydroxy compounds which contain a 5-membered cyclic structure or 6-membered cyclic structure include alicyclic dihydroxy compounds represented by the following general formula (I) or (II).

$$HOCH_2-R_5-CH_2OH \quad (I)$$

$$HO-R_6-OH \quad (II)$$

(In the formula (I) and the formula (II), $R_5$ and $R_6$ each independently represent a divalent group including a substituted or unsubstituted cycloalkyl structure having 4-20 carbon atoms.)

Cyclohexanedimethanol, which is an alicyclic dihydroxy compound represented by the general formula (I), includes various isomers represented by the general formula (I) in which $R_5$ is represented by the following general formula (Ia) (wherein $R^3$ represents a hydrogen atom or a substituted or unsubstituted alkyl group having 1-12 carbon atoms). Specific examples thereof include 1,2-cyclohexanedimethanol, 1,3-cyclohexanedimethanol, and 1,4-cyclohexanedimethanol.

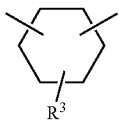

(Ia)

Tricyclodecanedimethanol and pentacyclopentadecanedimethanol, which are alicyclic dihydroxy compounds represented by the general formula (I), include various isomers represented by the general formula (I) in which $R_5$ is represented by the following general formula (Ib) (wherein n represents 0 or 1).

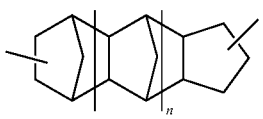

(Ib)

Decalindimethanol or tricyclotetradecanedimethanol, which is an alicyclic dihydroxy compound represented by the general formula (I), includes various isomers represented by the general formula (I) in which $R_5$ is represented by the following general formula (Ic) (wherein m represents 0 or 1). Specific examples thereof include 2,6-decalindimethanol, 1,5-decalindimethanol, and 2,3-decalindimethanol.

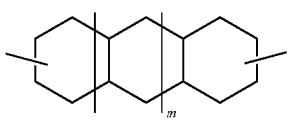

(Ic)

Norbornanedimethanol, which is an alicyclic dihydroxy compound represented by the general formula (I), includes various isomers represented by the general formula (I) wherein $R_5$ is represented by the following general formula (Id). Specific examples thereof include 2,3-norbornanedimethanol and 2,5-norbornanedimethanol.

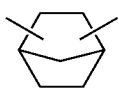

(Id)

Adamantanedimethanol, which is an alicyclic dihydroxy compound represented by the general formula (I), includes various isomers represented by the general formula (I) in which $R_5$ is represented by the following general formula (Ie). Specific examples thereof include 1,3-adamantanedimethanol.

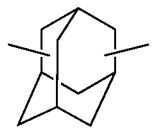

(Ie)

Meanwhile, cyclohexanediol, which is an alicyclic dihydroxy compound represented by the general formula (II), includes various isomers represented by the general formula (II) in which $R_6$ is represented by the following general formula (IIa) (wherein $R^3$ represents a hydrogen atom or a substituted or unsubstituted alkyl group having 1-12 carbon atoms). Specific examples thereof include 1,2-cyclohexanediol, 1,3-cyclohexanediol, 1,4-cyclohexanediol, and 2-methyl-1,4-cyclohexanediol.

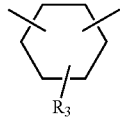

(IIa)

Tricyclodecanediol and pentacyclopentadecanediol, which are alicyclic dihydroxy compounds represented by the general formula (II), include various isomers represented by the general formula (II) in which $R_6$ is represented by the following general formula (IIb) (wherein n represents 0 or 1).

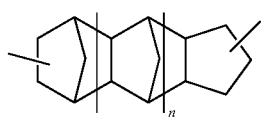

(IIb)

Decalindiol or tricyclotetradecanediol, which is an alicyclic dihydroxy compound represented by the general formula (II), includes various isomers represented by the general formula (II) in which $R_6$ is represented by the following general formula (IIc) (wherein m represents 0 or 1). Specifically, 2,6-decalindiol, 1,5-decalindiol, 2,3-decalindiol, and the like may be used as such compounds.

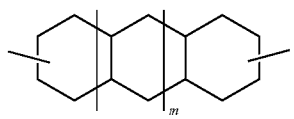

(IIc)

Norbornanediol, which is an alicyclic dihydroxy compound represented by the general formula (II), includes various isomers represented by the general formula (II) in which $R_6$ is represented by the following general formula (IId). Specifically, 2,3-norbornanediol, 2,5-norbornanediol, and the like may be used as such compounds.

[Chem. 17]

(IId)

Adamantanediol, which is an alicyclic dihydroxy compound represented by the general formula (II), includes various isomers represented by the general formula (II) in which $R_6$ is represented by the following general formula (IIe). Specifically, 1,3-adamantanediol and the like may be used as such compounds.

[Chem. 18]

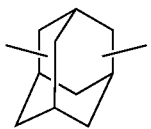

(IIe)

Preferred of the examples of alicyclic dihydroxy compounds described above are cyclohexanedimethanols, tricyclodecanedimethanols, adamantanediols, and pentacyclopentadecanedimethanols. Especially preferred from the standpoints of availability and handleability are 1,4-cyclohexanedimethanol, 1,3-cyclohexanedimethanol, 1,2-cyclohexanedimethanol, and tricyclodecanedimethanol.

These compounds shown above as examples are mere examples of alicyclic dihydroxy compounds usable in the first aspect of the invention, and the alicyclic dihydroxy compounds should not be construed as being limited to these examples in any way. One of these alicyclic dihydroxy compounds may be used alone, or a mixture of two or more thereof may be used.

In the polycarbonate resin, the molar ratio of constituent units derived from a dihydroxy compound having the portion represented by the general formula (1) as part of the structure thereof to constituent units derived from an alicyclic dihydroxy compound can be selected at will. However, there is a possibility that by regulating the molar ratio, impact strength (e.g., notched Charpy impact strength) might be improved. Furthermore, by regulating the molar ratio, the polycarbonate resin can be made to have a desired glass transition temperature.

In the polycarbonate resin, the molar ratio of constituent units derived from a dihydroxy compound having the portion represented by the general formula (1) as part of the structure thereof to constituent units derived from an alicyclic dihydroxy compound is preferably from 80:20 to 30:70, more preferably from 70:30 to 40:60. In the case where the proportion of the constituent units derived from a dihydroxy compound having the portion represented by the general formula (1) as part of the structure thereof is larger than that range, the polycarbonate resin is apt to take a color. Conversely, in the case where the proportion of the constituent units derived from a dihydroxy compound having the portion represented by the general formula (1) as part of the structure thereof is too small, there are tendencies that it is difficult to attain a high molecular weight and to improve impact strength and that the polycarbonate resin has a lowered glass transition temperature.

Besides having the constituent units derived from a dihydroxy compound having the portion represented by the general formula (1) as part of the structure thereof, structural units derived from an aliphatic dihydroxy compound, and constituent units derived from an alicyclic dihydroxy compound, the polycarbonate resin may contain structural units derived from other dihydroxy compounds. Examples of the other dihydroxy compounds include aromatic dihydroxy compounds.

Examples of the aromatic dihydroxy compounds include bisphenol compounds (including substituted and unsubstituted bisphenol compounds in the first aspect of the invention). Specific examples thereof include: bisphenol compounds in which the aromatic rings have no substituent thereon, such as bis(4-hydroxyphenyl)methane, 1,1-bis(4-hydroxyphenyl)ethane, 1,1-bis(4-hydroxyphenyl)propane, 2,2-bis(4-hydroxyphenyl)propane, 1,1-bis(4-hydroxyphenyl)butane, 2,2-bis(4-hydroxyphenyl)butane, 1,1-bis(4-hydroxyphenyl)pentane, 2,2-bis(4-hydroxyphenyl)pentane, 3,3-bis(4-hydroxyphenyl)pentane, 2,2-bis(4-hydroxyphenyl)-3-methylbutane, 1,1-bis(4-hydroxyphenyl)hexane, 2,2-bis(4-hydroxyphenyl)hexane, 3,3-bis(4-hydroxyphenyl)hexane, 2,2-bis(4-hydroxyphenyl)-4-methylpentane, 1,1-bis(4-hydroxyphenyl)cyclopentane, and 1,1-bis(4-hydroxyphenyl)cyclohexane; bisphenol compounds in which the aromatic rings have aryl groups as substituents thereon, such as bis(3-phenyl-4-hydroxyphenyl)methane, 1,1-bis(3-phenyl-4-hydroxyphenyl)ethane, 1,1-bis(3-phenyl-4-hydroxyphenyl)propane, and 2,2-bis(3-phenyl-4-hydroxyphenyl)propane; bisphenol compounds in which the aromatic rings have alkyl groups as substituents thereon, such as bis(4-hydroxy-3-methylphenyl)methane, 1,1-bis(4-hydroxy-3-methylphenyl)ethane, 1,1-bis(4-hydroxy-3-methylphenyl)propane, 2,2-bis(4-hydroxy-3-methylphenyl)propane, 1,1-bis(4-hydroxy-3-methylphenyl)cyclohexane, bis(4-hydroxy-3-ethylphenyl)methane, 1,1-bis(4-hydroxy-3-ethylphenyl)ethane, 1,1-bis(4-hydroxy-3-ethylphenyl)propane, 2,2-bis(4-hydroxy-3-ethylphenyl)propane, 1,1-bis(4-hydroxy-3-ethylphenyl)cyclohexane, 2,2-bis(4-hydroxy-3-isopropylphenyl)propane, 2,2-bis(4-hydroxy-3-(sec-butyl)phenyl)propane, bis(4-hydroxy-3,5-dimethylphenyl)methane, 1,1-bis(4-hydroxy-3,5-dimethylphenyl)ethane, 2,2-bis(4-hydroxy-3,5-dimethylphenyl)propane, 1,1-bis(4-hydroxy-3,5-dimethylphenyl)cyclohexane, bis(4-hydroxy-3,6-dimethylphenyl)methane, 1,1-bis(4-hydroxy-3,6-dimethylphenyl)ethane, 2,2-bis(4-hydroxy-3,6-dimethylphenyl)propane, bis(4-hydroxy-2,3,5-trimethylphenyl)methane, 1,1-bis(4-hydroxy-2,3,5-trimethylphenyl)ethane, 2,2-bis(4-hydroxy-2,3,5-trimethylphenyl)propane, bis(4-hydroxy-2,3,5-trimethylphenyl)phenylmethane, 1,1-bis(4-hydroxy-2,3,5-trimethylphenyl)phenylethane, and 1,1-bis(4-hydroxy-2,3,5-trimethylphenyl)cyclohexane; bisphenol compounds in which the divalent group that links the aromatic rings has one or more aryl groups as substituents, such as bis(4-hydroxyphenyl)phenylmethane, 1,1-bis(4-hydroxyphenyl)-1-phenylethane, 1,1-bis(4-hydroxyphenyl)-1-phenylpropane, bis(4-hydroxyphenyl)diphenylmethane, and bis(4-hydroxyphenyl)dibenzylmethane; bisphenol compounds in which the aromatic rings have been linked to each other by an ether bond, such as 4,4'-dihydroxydiphenyl ether and 3,3',5,5'-tetramethyl-4,4'-dihydroxydiphenyl ether; bisphenol compounds in which the aromatic rings have been linked to each other by a sulfone bond, such as 4,4'-dihydroxydiphenyl sulfone and 3,3',5,5'-tetramethyl-4,4'-dihydroxydiphenyl sulfone; and bisphenol compounds in which the aromatic rings have been linked to each other by a sulfide bond, such as 4,4'-dihydroxydiphenyl sulfide and 3,3',5,5'-tetramethyl-4,4'- dihydroxydiphenyl sulfide. Preferred examples thereof include 2,2-bis(4-hydroxyphenyl)propane (hereinafter often referred to as "bisphenol A").

The content of structural units derived from the bisphenol compounds described above is preferably 0 mol % or higher but less than 1 mol %, more preferably mol % or higher but less than 0.8 mol %, and even more preferably 0 mol % or higher but less than 0.5 mol %. In the case where the content of structural units derived from the bisphenol compounds is too high, there is a possibility that considerable coloring might occur.

One of the other dihydroxy compounds described above may be used alone, or a mixture of two or more thereof may be used.

(Carbonic Diester)

The polycarbonate resin in the first aspect of the invention can be produced by a polymerization method in general use. The polymerization method may be either an interfacial polymerization method in which phosgene is used or a melt polymerization method in which dihydroxy compounds are subjected to a transesterification reaction with a carbonic diester. However, the melt polymerization method is preferred in which dihydroxy compounds are reacted with a carbonic diester, which is less toxic to the environment, in the presence of a polymerization catalyst.

The polycarbonate resin can be obtained by the melt polymerization method in which dihydroxy compounds including the dihydroxy compound according to the invention described above are subjected to a transesterification reaction with a carbonic diester.

Examples of the carbonic diester to be used usually include compounds represented by the following general formula (4). One of these carbonic diesters may be used alone, or a mixture of two or more thereof may be used.

[Chem. 19]

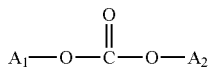

(4)

In the general formula (4), $A^1$ and $A^2$ each independently are a substituted or unsubstituted aliphatic group having 1-18 carbon atoms or a substituted or unsubstituted aromatic group.

Examples of the carbonic diesters represented by the general formula (4) include diphenyl carbonate, substituted diphenyl carbonates, e.g., ditolyl carbonate, dimethyl carbonate, diethyl carbonate, and di-t-butyl carbonate. Preferred are diphenyl carbonate and substituted diphenyl carbonates. Especially preferred is diphenyl carbonate. Incidentally, there are the cases where carbonic diesters contain impurities such as chloride ions and where the impurities inhibit the polymerization reaction and impair the hue of the polycarbonate resin to be obtained. It is therefore preferred that a carbonic diester which has been purified by, for example, distillation should be used according to need.

The carbonic diester is used in such an amount that the molar ratio thereof to all dihydroxy compounds to be subjected to the melt polymerization is preferably 0.90-1.20, more preferably 0.95-1.10, even more preferably 0.96-1.10, especially preferably 0.98-1.04.

In the case where the molar ratio is less than 0.90, the polycarbonate resin produced has an increased amount of terminal hydroxyl groups and has impaired thermal stability. This polymer may cause the polycarbonate resin composition to take a color upon molding. There also is a possibility that the rate of the transesterification reaction might decrease or it might be impossible to obtain a polymer having a desired high molecular weight.

Meanwhile, in the case where the molar ratio exceeds 1.20, the rate of the transesterification reaction decrease when the reaction is conducted under the same conditions, making it difficult to produce a polycarbonate resin having a desired molecular weight. In addition, the polycarbonate resin produced contains a larger amount of the carbonic diester remaining therein, and there are the cases where the residual carbonic diester undesirably causes an odor during molding or makes the molded article odorous. There also is a possibility that the heat history during the polymerization reaction might be enhanced, resulting in a polycarbonate resin having an impaired hue or impaired weatherability.

Furthermore, too large molar ratios of the carbonic diester to all dihydroxy compounds are undesirable because there are the cases where the polycarbonate resin obtained contains an increased amount of the carbonic diester remaining therein and this residual carbonic diester absorbs ultraviolet rays to impair the light resistance of the polycarbonate resin. It is preferable that the concentration of the carbonic diester remaining in the polycarbonate resin according to the invention should be preferably 200 weight ppm or less, more preferably 100 weight ppm or less, especially preferably 60 weight ppm or less, in particular 30 weight ppm or less. However, since there are the cases where the polycarbonate resin actually contains the unreacted carbonic diester, a lower limit of the concentration of the unreacted carbonic diester in the polycarbonate resin is usually 1 weight ppm <Transesterification Reaction Catalyst>

The polycarbonate resin can be produced by subjecting one or more dihydroxy compounds including the dihydroxy compound according to the invention and a carbonic diester represented by the general formula (4) to a transesterification reaction, as described above. More specifically, the polycarbonate resin is obtained by subjecting the starting materials to a transesterification reaction and removing the by-product monohydroxy compound, etc. from the system. In this case, melt polymerization is usually conducted by means of a transesterification reaction in the presence of a transesterification reaction catalyst.

Examples of transesterification reaction catalyst (hereinafter often referred to as "catalyst") which can be used for producing the polycarbonate resin include compounds of metals belonging to the Group 1 or Group 2 of the long-form periodic table (Nomenclature of Inorganic Chemistry IUPAC Recommendations 2005) (hereinafter referred to simply as "Group 1" or "Group 2") and basic compounds such as basic boron compounds, basic phosphorus compounds, basic ammonium compounds, and amine compounds. It is preferred to use a Group-1 metal compound and/or a Group-2 metal compound.

It is possible to use a basic compound such as a basic boron compound, basic phosphorus compound, basic ammonium compound, or amine compound as an auxiliary together with a Group-1 metal compound and/or a Group-2 metal compound. It is, however, especially preferred to use a Group-1 metal compound and/or a Group-2 metal compound only.

With respect to the form of the Group-1 metal compound and/or Group-2 metal compound, the compound is usually in the form of a hydroxide or a salt such as carbonate, carboxylate, or phenolate. However, hydroxides, carbonates, and acetates are preferred from the standpoints of availability and handleability, and acetates are preferred from the standpoints of hue and activity in polymerization.

Examples of the Group-1 metal compound include sodium hydroxide, potassium hydroxide, lithium hydroxide, cesium hydroxide, sodium hydrogen carbonate, potassium hydrogen carbonate, lithium hydrogen carbonate, cesium hydrogen carbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium boron hydride, potassium boron hydride, lithium boron hydride, cesium boron hydride, phenylated boron-sodium compounds, phenylated boron-potassium compounds, phenylated boron-lithium compounds, phenylated boron-cesium compounds, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenyl phosphate, dipotassium phenyl phosphate, dilithium phenyl phosphate, dicesium phenyl phosphate, alcoholates or phenolates of sodium, potassium, lithium, and cesium, and the disodium salt, dipotassium salt, dilithium salt, and dicesium salt of bisphenol A. Preferred of these are the cesium compounds and the lithium compounds.

Examples of the Group-2 metal compound include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Preferred of these are the magnesium compounds, the calcium compounds, and the barium compounds. More preferred are the magnesium compounds and/or the calcium compounds.

Examples of the basic boron compounds include the sodium salts, potassium salts, lithium salts, calcium salts, barium salts, magnesium salts, or strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron, and butyltriphenylboron.

Examples of the basic phosphorus compounds include triethylphosphine, tri-n-propylphosphine, triisopropylphosphine, tri-n-butylphosphine, triphenylphosphine, tributylphosphine, and quaternary phosphonium salts.

Examples of the basic ammonium compounds include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine compounds include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

It is preferred that at least one metal compound selected from the group consisting of compounds of Group-2 metals of the long-form periodic table and lithium compounds, among the compounds shown above, should be used as the catalyst, from the standpoint of yielding a polycarbonate resin which is excellent in terms of various properties including transparency, hue, and light resistance.

From the standpoint of enabling the polycarbonate resin according to the invention to be highly excellent in terms of transparency, hue, and light resistance, it is preferred that the catalyst should be at least one metal compound selected from the group consisting of magnesium compounds and calcium compounds.

In the case where the catalyst is a Group-1 metal compound and/or a Group-2 metal compound, the amount of the catalyst to be used, in terms of metal amount per mole of all dihydroxy compounds to be subjected to the polymerization, is in the range of desirably 0.1-300 μmol, preferably 0.1-100 μmol, more preferably 0.1-100 μmol, even more preferably 0.5-50 μmol, especially preferably 1-25 μmol.

In particular, when use is made of one or more compounds containing at least one metal selected from the group consisting of lithium and Group-2 metals of the long-form periodic table, and especially when a magnesium compound and/or a calcium compound is used, then the amount of the catalyst in terms of metal amount per mole of all dihydroxy compounds is preferably 0.1 μmol or more, more preferably 0.5 μmol or more, especially preferably 0.7 μmol or more. The upper limit thereof is preferably 20 μmol, more preferably 10 μmol, especially preferably 3 μmol, most preferably 2.0 μmol.

In the case where the catalyst is used in too small an amount, there is a possibility that polymerization activity necessary for producing a polycarbonate resin having a desired molecular weight might not be obtained and sufficient fracture energy might not be obtained. On the other hand, in the case where the catalyst is used in too large an amount, not only the polycarbonate resin obtained has an impaired hue but also there are the cases where by-products generate to cause a decrease in flowability and enhanced gel formation, which is causative of brittle fracture. Namely, there is a possibility that it might be difficult to produce a polycarbonate resin of desired quality.

<Process for Producing the Polycarbonate Resin>

Although the polycarbonate resin is obtained by melt-polymerizing one or more dihydroxy compounds including the dihydroxy compound according to the invention with a carbonic diester by means of a transesterification reaction, it is preferred to evenly mix the starting materials, i.e., the dihydroxy compounds and the carbonic diester, prior to the transesterification reaction.

The temperature at which the starting materials are mixed together is generally 80° C. or higher, preferably 90° C. or higher, and the upper limit thereof is generally 250° C. or lower, preferably 200° C. or lower, more preferably 150° C. or lower. Especially suitable is a temperature of 100-120° C. In the case where the mixing temperature is too low, there is a possibility that the starting materials might show too low a dissolution rate or insufficient solubility, often resulting in troubles such as solidification. When the mixing temperature is too high, there are the cases where the dihydroxy compounds suffer a thermal deterioration and there is a possibility that the resultant polycarbonate resin might have an impaired hue to exert an adverse influence on light resistance.

From the standpoint of preventing the polycarbonate resin to be obtained from having an impaired hue, it is preferred that an operation for mixing the dihydroxy compounds including the dihydroxy compound (1) and a carbonic diester represented by the formula (4) should be conducted in an atmosphere having an oxygen concentration of 10% by volume or less, preferably 0.0001-10% by volume, especially 0.0001-5% by volume, in particular 0.0001-1% by volume.

It is preferred that the polycarbonate resin should be produced by melt-polymerizing the starting materials in multiple stages using a catalyst and a plurality of reactors. The reasons why the melt polymerization is conducted in a plurality of reactors are that in the initial stage of the melt polymerization reaction, since the monomers are contained in a large amount in the liquid reaction mixture, it is important that the monomers should be inhibited from volatilizing off while maintaining a necessary polymerization rate, and that in the late stage of the melt polymerization reaction, it is important to sufficiently remove by distillation the by-product monohydroxy compound in order to shift the equilibrium to the polymerization side. For thus setting different sets of polymerization reaction conditions, it is preferred to use a plurality of reactors arranged serially, from the standpoint of production efficiency. The number of reactors to be used is not limited so long as the number thereof is at least 2 as stated above. From the standpoints of production efficiency, etc., the number thereof is 3 or more, preferably 3-5, especially preferably 4. The mode of reaction operation may be any of the batch type, the continuous type, and a combination of the batch type and the continuous type.

To provide a polymerization reactor with a reflux condenser is effective for inhibiting the monomers from being distilled off. This effect is high especially in the reactor for the initial stage of polymerization, in which the amount of unreacted monomer ingredients is large. The temperature of the coolant which is being introduced into the reflux condenser can be suitably selected according to the monomers used. However, the temperature of the coolant being introduced into the reflux condenser, as measured at the inlet of the reflux condenser, is generally 45-180° C., preferably 80-150° C., especially preferably 100-130° C. In the case where the temperature of the coolant being introduced into the reflux condenser is too high, the amount of the monomers being refluxed decreases, resulting in a decrease in the effect of the refluxing. In the case where the temperature thereof is too low, the efficiency of the removal by distillation of the monohydroxy compound to be removed by distillation tends to decrease. As the coolant, use may be made of hot water, steam, a heat-medium oil, or the like. Preferred is steam or a heat-medium oil.

The selection of the kind and amount of a catalyst described above is important for maintaining a suitable polymerization rate and inhibiting the monomers from being distilled off and for simultaneously enabling the finally obtained polycarbonate resin to have intact properties such as hue, thermal stability, and light resistance.

When the polycarbonate resin is produced, the process may be conducted in various manners so long as two or more reactors are used. For example, a plurality of reaction stages differing in conditions are formed in any of the reactors, or the temperature and the pressure may be continuously changed in any of the reactors.

In the production of the polycarbonate resin, the catalyst can be introduced into a starting-material preparation tank or a starting-material storage tank, or can be introduced directly into a reactor. However, from the standpoints of stability of feeding and melt polymerization control, a catalyst supply line is disposed somewhere in a starting-material line before a reactor, and the catalyst is supplied preferably in the form of an aqueous solution.

With respect to polymerization conditions, it is preferred that in the initial stage of the polymerization, the polymerization should be conducted at a relatively low temperature and under relatively low vacuum to obtain a prepolymer, and that in the late stage of the polymerization, the polymerization should be conducted at a relatively high temperature under relatively high vacuum to heighten the molecular weight to a given value. It is, however, important, from the standpoint of the hue and light resistance of the polycarbonate resin to be obtained, that a jacket temperature, an internal temperature, and an internal pressure of the system should be suitably selected for each molecular-weight stage. For example, in the case where either temperature or pressure is changed before the polymerization reaction reaches a given value, an unreacted monomer is distilled off to change the molar ratio of the dihydroxy compounds to the carbonic diester. This may result in a decrease in polymerization rate or make it impossible to obtain a polymer having a given molecular weight or having given end groups. There is hence a possibility that the objects of the invention cannot finally be accomplished.

With respect to transesterification reaction temperature, too low temperatures result in a decrease in productivity and cause the product to undergo an enhanced heat history. Too high temperatures result not only in monomer volatilization but also in the possibility of enhancing degradation and coloring of the polycarbonate resin.

The process for producing the polycarbonate resin by subjecting one or more dihydroxy compounds including a dihydroxy compound having the portion represented by the general formula (1) as part of the structure thereof to a transesterification reaction with a carbonic diester in the presence of a catalyst is usually conducted in multiple stages, i.e., two or more stages. Specifically, the transesterification reaction temperature (hereinafter often referred to as "internal temperature") in the first stage is generally 140° C. or higher, preferably 150° C. or higher, more preferably 180° C. or higher, even more preferably 200° C. or higher, and is generally 270° C. or lower, preferably 240° C. or lower, more preferably 230° C. or lower, even more preferably 220° C. or lower. The residence time is generally 0.1-10 hours, preferably 0.5-3 hours, and the reaction is conducted while the monohydroxy compound which generates is being removed from the reaction system by distillation. In the second and any succeeding stages, the transesterification reaction temperature is elevated and the reaction is conducted at a temperature of generally 210-270° C., preferably 220-250° C. The reaction is performed while gradually lowering the pressure of the reaction system from the pressure used in the first stage and while the monohydroxy compound which generates is being simultaneously removed from the reaction system. Finally, the polycondensation reaction is conducted at a pressure of the reaction system lowered to 200 Pa or below, for a period of generally 0.1-10 hours, preferably 0.5-6 hours, especially preferably 1-3 hours. When the transesterification reaction temperature is too high, there is a possibility that the polycarbonate resin composition might give molded articles which are apt to have an impaired hue and to suffer brittle fracture. When the transesterification reaction temperature is too low, there are the cases where the molecular weight is not heightened to a desired level and where a widened molecular weight distribution and poor impact strength result. When the residence time in the transesterification reaction is too long, there are the cases where brittle fracture is apt to occur. When the residence time is too short, there are the cases where the molecular weight is not heightened to a desired level, resulting in poor impact strength.

From the standpoint of effective utilization of resources, it is preferred that the monohydroxy compound which generated as a by-product should be reused as a starting material for carbonic diesters or various bisphenol compounds after purified according to need.

Especially from the standpoint of obtaining a satisfactory polycarbonate resin which is inhibited from taking a color, deteriorating thermally, or scorching and which has high impact strength, it is preferred that the maximum internal temperature throughout all reaction stages should be lower than 255° C., more preferably 250° C. or lower, in particular 225-245° C. Furthermore, from the standpoints of inhibiting the rate of polymerization from decreasing in the latter half of the polymerization reaction and of thereby minimizing the thermal deterioration of the polycarbonate resin which is caused by heat history, it is preferred to use, in the final stage of the reaction, a horizontal reactor having excellent plug flow characteristics and interface renewal characteristics.

There are the cases where a polymerization temperature which is as high as possible and a polymerization time which is as long as possible are used in order to obtain a polycarbonate resin having a high molecular weight, in an attempt to produce a polycarbonate resin having high impact strength. However, this polycarbonate resin tends to contain foreign matter, have scorched, and be apt to suffer brittle fracture. Consequently, from the standpoint of satisfying both an increase in impact strength and less susceptibility to brittle fracture, it is preferred to use a lowered polymerization temperature, to use a highly active catalyst for shortening polymerization time, to properly set a pressure of the reaction system, etc. Furthermore, the foreign matter, scorched particles, and the like which have generated in the reaction system may be removed with a filter or the like during the reaction or in the final stage of the reaction. This removal is preferred because the polycarbonate resin is rendered less apt to suffer brittle fracture.

In the case where diphenyl carbonate or a substituted diphenyl carbonate, e.g., ditolyl carbonate, is used as a carbonic diester represented by the formula (4) to produce a polycarbonate resin, phenol or a substituted phenol generates as a by-product and unavoidably remains in the polycarbonate resin. However, since phenol and the substituted phenol also have an aromatic ring, there are the cases where not only these compounds absorb ultraviolet rays to serve as a factor contributing to a deterioration in light resistance but also the compounds are causative of an odor during molding. After an ordinary batch reaction, the polycarbonate resin contains an aromatic monohydroxy compound having an aromatic ring, e.g., by-product phenol, in an amount of 1,000 weight ppm or more. From the standpoints of light resistance and odor diminution, it is preferred to reduce the content of the aromatic monohydroxy compound in the polycarbonate resin to preferably 700 weight ppm or less, more preferably 500 weight ppm or less, especially 300 weight ppm or less, using a horizontal reactor having excellent volatilizing performance or using an extruder equipped with a vacuum vent. It is, however, noted that it is difficult to industrially completely remove the aromatic monohydroxy compound and a lower limit of the content thereof in the polycarbonate resin is generally 1 weight ppm. Those aromatic monohydroxy compounds may, of course, have substituents, depending on the starting materials used. For example, the compounds may have an alkyl group having up to 5 carbon atoms, or the like.

There are the cases where Group-1 metals, especially lithium, sodium, potassium, and cesium, in particular, sodium, potassium, and cesium, come not only from the catalyst used but also from starting materials or the reactor. There is a possibility that these metals, when contained in the polycarbonate resin in a large amount, might adversely affect the hue. Consequently, it is preferred that the total amount of compounds of those metals in the polycarbonate resin according to the invention should be smaller. The total amount thereof in terms of metal amount in the polycarbonate resin is preferably 1 weight ppm or less, preferably 0.8 weight ppm or less, more preferably 0.7 weight ppm or less.

The content of metals in the polycarbonate resin can be determined by various conventionally known methods. The content thereof can be determined by recovering the metals contained in the polycarbonate resin by a technique such as wet ashing and then determining the amount of the metals using a technique such as atomic emission, atomic absorption, or inductively coupled plasma (ICP) spectroscopy.

The polycarbonate resin, after having been obtained through melt polymerization as described above, is usually solidified by cooling and pelletized with a rotary cutter or the like.

Methods for the pelletization are not limited. Examples thereof include: a method in which the polycarbonate resin is discharged in a molten state from the final polymerization reactor, cooled and solidified in a strand form, and pelletized; a method in which the resin is fed in a molten state from the final polymerization reactor to a single- or twin-screw extruder, melt-extruded, subsequently cooled and solidified, and pelletized; and a method which includes discharging the resin in a molten state from the final polymerization reactor, cooling and solidifying the resin in a strand form, temporarily pelletizing the resin, thereafter feeding the resin to a single- or twin-screw extruder again, melt-extruding the resin, and then cooling, solidifying, and pelletizing the resin.

During such operations, residual monomers can be removed by volatilization under vacuum within the extruder. It is also possible to add generally known additives such as a heat stabilizer, neutralizing agent, ultraviolet absorber, release agent, colorant, antistatic agent, slip agent, lubricant, plasticizer, compatibilizing agent, and flame retardant and knead the mixture within the extruder.

The temperature to be used for melt kneading in the extruder depends on the glass transition temperature and molecular weight of the polycarbonate resin. However, the melt kneading temperature is generally 150-300° C., preferably 200-270° C., more preferably 230-260° C. In the case where the melt kneading temperature is lower than 150° C., the polycarbonate resin has a high melt viscosity and imposes an increased load on the extruder, resulting in a decrease in productivity. In the case where the melt kneading temperature is higher than 300° C., the polycarbonate thermally deteriorates considerably, resulting in a decrease in mechanical strength due to a decrease in molecular weight and further resulting in coloring, gas evolution, generation of foreign matter, and scorching. It is preferred that a filter for removing the foreign matter and scorched particles should be disposed within the extruder or at the outlet of the extruder.

The rejection size (opening size) of the filter is generally 400 μm or smaller, preferably 200 μm or smaller, especially preferably 100 μm or smaller, in terms of 99% removal filtration accuracy. When the opening size of the filter is too large, there are the cases where the foreign matter and scorched particles partly remain unremoved, resulting in a possibility that molded objects obtained from the polycarbonate resin might suffer brittle fracture. When the polycarbonate resin composition of the invention is for use in some applications, for example, when the composition is for use in film applications where defects must be eliminated, then the opening size of the filter is preferably 40 µm or smaller, more preferably 10 µm or smaller, so as to meet the requirement for the applications.

A plurality of such filters may be serially disposed and used. Alternatively, a filtration device including a stack of multiple sheets of a leaf disk type polymer filter may be used.

Furthermore, for cooling and pelletizing the extrusion-molded polycarbonate resin, it is preferred to use a cooling method such as air cooling or water cooling. It is desirable that air from which airborne foreign matter has been removed beforehand with a HEPA filter (preferably, the filter as provided for in JIS Z8112) or the like should be used for the air cooling to prevent airborne foreign matter from adhering again. It is more preferred to conduct the cooling and pelletization in a clean room having a cleanliness higher than the class 7 defined in JIS B 9920 (2002), more preferably higher than the class 6. In the case of employing water cooling, it is desirable to use water from which metallic substances have been removed with an ion-exchange resin or the like and from which foreign matter has been removed with a filter. Although there are filters having various opening sizes, it is preferred to use a filter having an opening size of 10-0.45 µm.

It is preferred that the polycarbonate resin should have a glass transition temperature (Tg) lower than 145° C. In the case where the glass transition temperature thereof is too high beyond that range, there is a possibility that this polycarbonate resin might be apt to take a color and it might be difficult to improve the impact strength thereof. In addition, in this case, it is necessary to set a higher mold temperature when this polycarbonate resin is molded to transfer the surface shape of the mold to the molded article. Because of this, there is a possibility that temperature controllers which can be selected might be limited and the shape of the mold surface might be poorly transferred.

The glass transition temperature of the polycarbonate resin is more preferably lower than 140° C., even more preferably lower than 135° C.

The glass transition temperature of the polycarbonate resin is generally 90° C. or higher, preferably 95° C. or higher.

Examples of methods for regulating the glass transition temperature of the polycarbonate resin to below 145° C. include: to reduce the proportion of structural units derived from a dihydroxy compound having the portion represented by the general formula (1) as part of the structure thereof; to select an alicyclic dihydroxy compound which is low in heat resistance; and to reduce the proportion of structural units derived from an aromatic dihydroxy compound, e.g., a bisphenol compound.

In the first aspect of the invention, the glass transition temperature is measured by the method which will be described later in the Examples given later.

The degree of polymerization of the polycarbonate resin, in terms of the reduced viscosity determined by using a mixed solvent composed of phenol and 1,1,2,2-tetrachloroethane in a weight ratio of 1:1 to prepare a solution having a polycarbonate concentration precisely regulated to 1.00 g/dL and measuring the viscosity thereof at a temperature of 30.0±0.1° C. (hereinafter referred to simply as "reduced viscosity"), is preferably 0.40 dL/g or higher, more preferably 0.42 dL/g or higher, especially preferably 0.45 dL/g or higher. However, there are the cases where the polycarbonate resin having a reduced viscosity of 0.60 dL/g or higher, in particular 0.85 dL/g or higher, is suitable, depending on applications of the polycarbonate resin composition of the invention. The reduced viscosity thereof is preferably 2.0 dL/g or less, more preferably 1.7 dL/g or less, especially preferably 1.4 dL/g or less. In the case where the reduced viscosity of the polycarbonate resin is too low, there are the cases where this resin has poor mechanical strength. In the case where the reduced viscosity of the polycarbonate resin is too high, this polycarbonate resin tends to show reduced flowability when being molded, thereby reducing cycle characteristics and giving molded articles which have enhanced strains and are apt to deform thermally.

When the polycarbonate resin is produced by the melt polymerization method, one or more phosphoric acid compounds or one or more phosphorous acid compounds can be added during the polymerization for the purpose of preventing coloring.

As the phosphoric acid compounds, use of one or more of trialkyl phosphates, e.g., trimethyl phosphate and triethyl phosphate, is suitable. The amount of these phosphoric acid compounds to be added is preferably 0.0001-0.005% by mole, more preferably 0.0003-0.003% by mole, based on all hydroxy compound ingredients. In the case where the amount of such phosphoric acid compounds added is smaller than the lower limit, the effect of preventing coloring is insufficient. In the case where the amount thereof is larger than the upper limit, the phosphoric acid compounds not only are causative of a decrease in transparency but also accelerate, rather than prevent, coloring and reduce heat resistance.

As the phosphorous acid compounds, one or more compounds can be selected at will from the following heat stabilizers and used. Especially suitable is one or more phosphorous acid compounds selected from trimethyl phosphite, triethyl phosphite, trisnonylphenyl phosphite, trimethyl phosphate, tris(2,4-di-tert-butylphenyl) phosphite, and bis(2,4-di-tert-butylphenyl)pentaerythritol diphosphite. The amount of these phosphorous acid compounds to be added is preferably 0.0001-0.005% by mole, more preferably 0.0003-0.003% by mole, based on all hydroxy compound ingredients. In the case where the amount of such phosphorous acid compounds added is smaller than the lower limit, the effect of preventing coloring is insufficient. When the amount thereof is larger than the upper limit, there are the cases where the phosphorous acid compounds not only are causative of a decrease in transparency but also accelerate, rather than prevent, coloring and reduce heat resistance.

A phosphoric acid compound and a phosphorous acid compound can be added in combination. In this case, the amount of these compounds to be added, in terms of the total amount of the phosphoric acid compound and the phosphorous acid compound based on all hydroxy compound ingredients described above, is preferably 0.0001-0.005% by mole, more preferably 0.0003-0.003% by mole. In the case where the amount of these compounds added is smaller than the lower limit, the effect of preventing coloring is insufficient. When the amount thereof is larger than the upper limit, there are the cases where these compounds not only are causative of a decrease in transparency but also accelerate, rather than prevent, coloring and reduce heat resistance.

One or more heat stabilizers may have been incorporated into the polycarbonate resin thus produced, in order to prevent the polycarbonate resin from suffering a decrease in molecular weight or a deterioration in hue during molding, etc.

Examples of the heat stabilizers include phosphorous acid, phosphoric acid, phosphonous acid, phosphonic acid, and esters thereof. Specific examples thereof include triphenyl phosphite, tris(nonylphenyl) phosphite, tris(2,4-di-tert-butylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis(4,6-di-tert-butylphenyl) octyl phosphite, bis(nonylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenyl mono-o-xenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, and dipropyl benzenephosphonate. Preferred of these are trisnonylphenyl phosphite, trimethyl phosphate, tris(2,4-di-tert-butylphenyl) phosphite, bis(2,4-di-tert-butylphenyl)pentaerythritol diphosphite, bis(2,6-di-tert-butyl-4-methylphenyl)pentaerythritol diphosphite, and dimethyl benzenephosphonate.

Such a heat stabilizer can be supplementally incorporated in addition to the amount of the stabilizer which was added during the melt polymerization. Namely, after a polycarbonate resin has been obtained in the presence of a phosphorous acid compound or phosphoric acid compound incorporated in a suitable amount, the phosphorous acid compound can be further incorporated by the incorporation method which will be described later. Thus, a heat stabilizer can be incorporated in a larger amount while avoiding a decrease in transparency, coloring, and a decrease in heat resistance during polymerization, thereby making it possible to prevent the polycarbonate resin from deteriorating in hue.

The content of those heat stabilizers per 100 parts by weight of the polycarbonate resin is preferably 0.0001-1 part by weight, more preferably 0.0005-0.5 parts by weight, even more preferably 0.001-0.2 parts by weight.

<Impact Strength Modifier>

The polycarbonate resin composition according to the first aspect of the invention includes the polycarbonate resin and an impact strength modifier. One of the features of the first aspect of the invention resides in a combination of the polycarbonate resin, which contains structural units derived from the dihydroxy compound and has a glass transition temperature lower than 145° C., and an impact strength modifier.

Although the polycarbonate resin which has a glass transition temperature lower than 145° C. is a resin which is less apt to take a color and has a satisfactory balance between heat resistance and impact resistance, there are the cases where it is necessary for practical use to further improve the impact resistance. In the polycarbonate resin composition according to the first aspect of the invention, the impact strength modifier is contained in combination with the polycarbonate resin, thereby mitigating the drawback and enabling the composition to combine heat resistance and impact resistance. Furthermore, by regulating the polycarbonate resin so as to have a glass transition temperature lower than 145° C., a high reduced viscosity can be attained while maintaining a low melt viscosity. By using this polycarbonate resin in combination with an impact resistance modifier, impact resistance can be synergistically improved as compared with the case where the glass transition temperature is 145° C. or higher. In addition, the polycarbonate resin composition according to the first aspect of the invention can be easily made to combine moldability and impact resistance by heightening the reduced viscosity while keeping the melt viscosity low. Moreover, the polycarbonate resin composition according to the first aspect of the invention retains the transparency which has not been impaired considerably, despite the impact strength modifier contained therein.

In the polycarbonate resin, the content of the impact strength modifier per 100 parts by weight of the polycarbonate resin is preferably 1 part by weight or more but less than 25 parts by weight.

In the case where the content of the impact strength modifier is too low and outside the range, there is a possibility that the effect of improving impact strength might not be sufficiently obtained and the molded member might rupture. On the other hand, in the case where the content thereof is too high and outside the range, there is a possibility that the satisfactory moldability might be impaired, resulting in scorching during molding, or that the transparency might be impaired. The content of the impact strength modifier is more preferably less than 20 parts by weight, even more preferably less than 15 parts by weight.

As the impact strength modifier, use can be made of a generally known material which improves impact strength. For example, a material having rubber elasticity can be used. It is preferred that an elastomer should be used as the impact strength modifier, and it is especially preferred to use a thermoplastic elastomer among elastomers. Although various copolymer resins are usable as the thermoplastic elastomers, copolymer resins having a glass transition temperature of usually 0° C. or lower, in particular −10° C. or lower, are preferred. The glass transition temperature thereof is more preferably −20° C. or lower, even more preferably −30° C. or lower. More specifically, use can be made, for example, of SB (styrene/butadiene) copolymers, SBS (styrene/butadiene/styrene block) copolymers, ABS (acrylonitrile/butadiene/styrene) copolymers, MBS (methyl methacrylate/butadiene/styrene) copolymers, MABS (methyl methacrylate/acrylonitrile/butadiene/styrene) copolymers, MB (methyl methacrylate/butadiene) copolymers, ASA (acrylonitrile/styrene/acrylic rubber) copolymers, AES (acrylonitrile/ethylene-propylene rubber/styrene) copolymers, MA (methyl methacrylate/acrylic rubber) copolymers, MAS (methyl methacrylate/acrylic rubber/styrene) copolymers, methyl methacrylate/acrylic/butadiene rubber copolymers, methyl methacrylate/acrylic/butadiene rubber/styrene copolymers, methyl methacrylate/(acrylic/silicone IPN rubber) copolymers, natural rubber, and the like.

It is preferred that the impact strength modifier should be a copolymer which contains butadiene.

In this case, an especially remarkable impact-strength-improving effect can be obtained due to a combination of the copolymer with the polycarbonate resin.

Specific examples of the copolymer containing butadiene include SBS (styrene/butadiene/styrene block) copolymers, ABS (acrylonitrile/butadiene/styrene) copolymers, MBS (methyl methacrylate/butadiene/styrene) copolymers, MABS (methyl methacrylate/acrylonitrile/butadiene/styrene) copolymers, MB (methyl methacrylate/butadiene) copolymers, and methyl methacrylate/acrylic/butadiene rubber copolymers.

The polycarbonate resin composition can be produced by mixing the polycarbonate resin with the impact strength modifier.

Specifically, the polycarbonate resin composition can be obtained by mixing the polycarbonate resin in, for example, a pellet form with the impact strength modifier using an extruder, extruding the mixture into a strand form, and cutting the extrudate into pellets with a rotary cutter or the like.

The polycarbonate resin composition has a notched Charpy impact strength of desirably 15 kJ/m$^2$ or higher, preferably 20 kJ/m$^2$ or higher, more preferably 25 kJ/m$^2$ or higher, even more preferably 40 kJ/m$^2$ or higher, especially preferably 49 kJ/m$^2$ or higher. From the standpoint of difficulty in implementation, an upper limit of the notched Charpy impact strength of the polycarbonate resin composition is 200 kJ/m$^2$.

The notched Charpy impact strength can be controlled by regulating the molecular weight, the molar proportions of the dihydroxy compounds, the kind or content of the impact strength modifier, etc. in the polycarbonate resin composition.

It is preferred that the polycarbonate resin composition should have a melt viscosity of 300 Pa·s or higher. In the case where the melt viscosity thereof is too low and outside the range, this composition may have insufficient mechanical strength. There is hence a possibility that when this composition is molded, for example, by injection molding, the molded article might break when being taken out of the mold or that the molded article might crack when in use. The melt viscosity of the polycarbonate resin composition is more preferably 450 Pa·s or higher, even more preferably 500 Pa·s or higher.

Meanwhile, it is preferred that the melt viscosity of the polycarbonate resin composition should be 800 Pa·s or less. In the case where the melt viscosity thereof is too high and outside the range, there is a possibility that it might be difficult to industrially produce the polycarbonate resin composition having high strength. In this case, there also is a possibility that the impaired flowability and an increase in molding temperature might be apt to result in coloring, a decrease in molecular weight, generation of a decomposition gas, etc. The melt viscosity of the polycarbonate resin composition is more preferably 700 Pa·s or less, even more preferably 640 Pa·s or less.

When the polycarbonate resin is mixed with the impact strength modifier, additives such as the antioxidant and release agent shown below can be suitably added according to need.

One or more generally known antioxidants can be incorporated into the polycarbonate resin composition for the purpose of preventing oxidation.

In the case where an antioxidant is used, the amount thereof per 100 parts by weight of the polycarbonate resin is generally 0.0001-1 part by weight, preferably 0.001 part by weight per more, more preferably 0.01 part by weight or more, and is generally 1 part by weight or less, preferably 0.5 parts by weight or less, more preferably 0.3 parts by weight or less.

When the content of the antioxidant based on the whole polycarbonate resin composition is not less than the lower limit, the effect of inhibiting coloring during molding tends to be satisfactory. However, in the case where the content of the antioxidant based on the whole polycarbonate resin composition exceeds the upper limit, injection molding may result in an increased amount of mold deposits or film formation by extrusion molding may result in an increased amount of roll deposits. There is hence a possibility that the product might have an impaired surface appearance.

It is preferred that the antioxidant should be at least one member selected from the group consisting of phenolic antioxidants, phosphate-based antioxidants, and sulfur-compound antioxidants. More preferred is a phenolic antioxidant and/or a phosphate-based antioxidant.

Examples of the phenolic antioxidants include compounds such as pentaerythritol tetrakis(3-mercaptopropionate), pentaerythritol tetrakis(3-laurylthiopropionate), glycerol 3-stearylthiopropionate, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl) propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamamide), diethyl 3,5-di-tert-butyl-4-hydroxybenzylphosphonate, tris(3,5-di-tert-butyl-4-hydroxybenzyl) isocyanurate, tetrakis(2,4-di-tert-butylphenyl) 4,4'-biphenylenediphosphinate, and 3,9-bis{1,1-dimethyl-2-[β-(3-tert-butyl-4-hydroxy-5-methylphenyl) propionyloxy]ethyl}-2,4,8,10-tetraoxaspiro(5.5)undecane.

Preferred of these compounds are the aromatic monohydroxy compounds substituted with one or more alkyl groups having 5 or more carbon atoms. Specifically, octadecyl 3-(3, 5-di-tert-butyl-4-hydroxyphenyl)propionate, pentaerythritol-tetrakis {3-(3,5-di-t-butyl-4-hydroxyphenyl)propionate}, 1,6-hexanediol-bis[3-(3,5-di-tert-butyl-4-hydroxyphenyl)propionate], 1,3,5-trimethyl-2,4,6-tris(3,5-di-tert-butyl-4-hydroxybenzyl)benzene, and the like are preferred. More preferred is pentaerythritol-tetrakis{3-(3,5-di-t-butyl-4-hydroxyphenyl)propionate.

Examples of the phosphate-based antioxidants include triphenyl phosphite, tris(nonylphenyl) phosphite, tris(2,4-di-tert-butylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis(4,6-di-tert-butylphenyl) octyl phosphite, bis(nonylphenyl)pentaerythritol diphosphite, bis(2,4-di-tert-butylphenyl)pentaerythritol diphosphite, and distearyl pentaerythritol diphosphite.

Preferred of these are trisnonylphenyl phosphite, trimethyl phosphate, tris(2,4-di-tert-butylphenyl) phosphite, bis(2,4-di-tert-butylphenyl)pentaerythritol diphosphite, and bis(2,6-di-tert-butyl-4-methylphenyl)pentaerythritol diphosphite. More preferred is tris(2,4-di-tert-butylphenyl) phosphite.

Examples of the sulfur-compound antioxidants include dilauryl-3,3'-thiodipropionate, ditridecyl-3,3'-thiodipropionate, dimyristyl-3,3'-thiodipropionate, distearyl-3,3'-thiodipropionate, lauryl stearyl-3,3'-thiodipropionate, pentaerythritol tetrakis(3-laurylthiopropionate), bis[2-methyl-4-(3-laurylthiopropionyloxy)-5-tert-butylphenyl]sulfide, octadecyl disulfide, mercaptobenzimidazole, 2-mercapto-6-methylbenzimidazole, and 1,1'-thiobis(2-naphthol). Preferred of these is pentaerythritol tetrakis(3-laurylthiopropionate).

One release agent alone or a mixture of two or more release agents may be used in the polycarbonate resin composition for the purpose of, for example, further improving releasability from the cooling roll during sheet molding or further improving releasability from the mold during injection molding, so long as the incorporation thereof does not defeat the objects of the invention.

Examples of the release agents include higher fatty acid esters of mono- or polyhydric alcohols, higher fatty acids, paraffin waxes, bees wax, olefin waxes, olefin waxes containing carboxy groups and/or carboxylic anhydride groups, silicone oils, and organopolysiloxanes.

The higher fatty acid esters preferably are partial or complete esters of mono- or polyhydric alcohols having 1-20 carbon atoms with saturated fatty acids having 10-30 carbon atoms. Examples of the partial or complete esters of mono- or polyhydric alcohols with saturated fatty acids include stearic monoglyceride, stearic diglyceride, stearic triglyceride, stearic acid monosorbitate, stearyl stearate, behenic monoglyceride, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate, and 2-ethylhexyl stearate. Preferred of these are stearic monoglyceride, stearic triglyceride, pentaerythritol tetrastearate, and behenyl behenate. From the standpoints of releasability and transparency, stearic esters are more preferred as release agents.

The stearic esters preferably are partial or complete esters of substituted or unsubstituted, mono- or polyhydric alcohols having 1-20 carbon atoms with stearic acid. More preferred of such partial or complete esters of mono- or polyhydric alcohols with stearic acid are ethylene glycol distearate, stearic monoglyceride, stearic diglyceride, stearic triglyceride, stearic acid monosorbitate, stearyl stearate, pentaerythritol monostearate, pentaerythritol tetrastearate, propylene glycol monostearate, stearyl stearate, butyl stearate, sorbitan monostearate, 2-ethylhexyl stearate, and the like. Even more preferred of these are stearic monoglyceride, stearic triglyceride, pentaerythritol tetrastearate, and stearyl stearate. Especially preferred are ethylene glycol distearate and stearic monoglyceride.

In the case where a release agent is used, the amount of the release agent to be incorporated, per 100 parts by weight of the polycarbonate resin, is generally 0.001 part by weight or more, preferably 0.01 part by weight or more, more preferably 0.1 part by weight or more, and is generally 2 parts by weight or less, preferably 1 part by weight or less, more preferably 0.5 parts by weight or less. When the content of the release agent is too large, there are the cases where molding results in an increased amount of mold deposits. There is hence a possibility that labor might be required for mold maintenance when the composition is molded in a large amount. There also is a possibility that the molded articles obtained might have an appearance failure. When the content of the release agent in the polycarbonate resin composition is not less than the lower limit, there is an advantage that the molded article during molding is easily separated from the mold, making it easy to obtain molded articles.

The higher fatty acids preferably are substituted or unsubstituted, saturated fatty acids having 10-30 carbon atoms. Preferred of these are unsubstituted saturated fatty acids having 10-30 carbon atoms. Examples of such higher fatty acids include myristic acid, lauric acid, palmitic acid, stearic acid, and behenic acid. Saturated fatty acids having 16-18 carbon atoms are more preferred, and examples of such saturated fatty acids include palmitic acid and stearic acid. Especially preferred is stearic acid.

This polycarbonate resin composition is far less apt to discolor by the action of ultraviolet rays than conventional polycarbonate resins. However, one or more ultraviolet absorbers or light stabilizers may have been incorporated into the composition for the purpose of a further improvement unless this incorporation defeats the objects of the invention.

The ultraviolet absorbers are not particularly limited so long as the absorbers are compounds which have the ability to absorb ultraviolet rays. Examples of the compounds having the ability to absorb ultraviolet rays include organic compounds and inorganic compounds. Of these, organic compounds are preferred because it is easy to ensure an affinity thereof for the polycarbonate resin and because it is easy to evenly disperse the compounds.

The organic compounds having the ability to absorb ultraviolet rays are not particularly limited in the molecular weights thereof. However, the molecular weights thereof are generally 200 or higher, preferably 250 or higher, and are generally 600 or less, preferably 450 or less, more preferably 400 or less. In the case where the molecular weights thereof are too low, there is a possibility that the organic compounds might cause the composition to decrease in ultraviolet resistance when used over a long period. In the case where the molecular weights thereof are too high, there is a possibility that the organic compounds might cause the resin composition to decrease in transparency when used over a long period.

Examples of preferred ultraviolet absorbers include benzotriazole compounds, benzophenone compounds, triazine compounds, benzoate compounds, salicylic acid phenyl ester compounds, cyanoacrylate compounds, malonic ester compounds, and oxalanilide compounds. Preferred of these are benzotriazole compounds, hydroxybenzophenone compounds, and malonic ester compounds. These compounds may be used either alone or in combination of two or more thereof.

More specific examples of the benzotriazole compounds include 2-(2'-hydroxy-3'-methyl-5'-hexylphenyl)benzotriazole, 2-(2'-hydroxy-3'-t-butyl-5'-hexylphenyl)benzotriazole, 2-(2'-hydroxy-3',5'-di-t-butylphenyl)benzotriazole, 2-(2'-hydroxy-3'-methyl-5'-t-octylphenyl)benzotriazole, 2-(2'-hydroxy-5'-t-dodecylphenyl)benzotriazole, 2-(2'-hydroxy-3'-methyl-5'-t-dodecylphenyl)benzotriazole, 2-(2'-hydroxy-5'-t-butylphenyl)benzotriazole, and methyl 3-(3-(2H-benzotriazol-2-yl)-5-t-butyl-4-hydroxyphenyl)propionate.

Examples of the benzophenone compounds include hydroxybenzophenone compounds such as 2,2'-dihydroxybenzophenone, 2,2',4,4'-tetrahydroxybenzophenone, and 2-hydroxy-4-octoxybenzophenone.

Examples of the malonic ester compounds include 2-(1-arylalkylidene)malonic esters and tetraethyl-2,2'-(1,4-phenylenedimethylidene)-bismalonate.

Examples of the triazine compounds include 2-[4-[(2-hydroxy-3-dodecyloxypropyl)oxy]-2-hydroxyphenyl]-4,6-bis (2,4-dimethylphenyl)-1,3,5-triazine, 2,4-bis(2,4-dimethylphenyl)-6-(2-hydroxy-4-isooctyloxyphenyl)-s-triazine, and 2-(4,6-diphenyl-1,3,5-triazin-2-yl)-5-[(hexyl)oxy]phenol (Tinuvin 1577FF, manufactured by Ciba-Geigy Ltd.)

Examples of the cyanoacrylate compounds include ethyl-2-cyano-3,3-diphenylacrylate and 2'-ethylhexyl-2-cyano-3,3-diphenylacrylate.

Examples of the oxalanilide compounds include 2-ethyl-2'-ethoxyoxalanilide (Sanduvor VSU, manufactured by Clariant Ltd.).

The content of such ultraviolet absorbers or light stabilizers can be suitably selected according to the kinds of the ultraviolet absorbers. However, it is preferred that an ultraviolet absorber should be contained in an amount of 0.001-5% by weight based on the whole polycarbonate resin composition, and it is preferred that the amount thereof should be 0.01-2 parts by weight per 100 parts by weight of the polycarbonate.

One or more bluing agents may have been incorporated into the polycarbonate resin composition in order to eliminate yellowness. Any bluing agent for conventional polycarbonate resins can be used without particularly raising difficulties. In general, anthraquinone dyes are easily available and preferred.

With respect to specific bluing agents, representative examples include common name Solvent Violet 13 [CA. No. (color index No.) 60725], common name Solvent Violet 31 [CA. No. 68210], common name Solvent Violet 33 [CA. No. 60725], common name Solvent Blue 94 [CA. No. 61500], common name Solvent Violet 36 [CA. No. 68210], common name Solvent Blue 97 ["Macrolex Violet RR", manufactured by Bayer AG], and common name Solvent Blue 45 [CA. No. 61110].

The content of these bluing agents is usually preferably $0.1 \times 10^{-4}$ to $2 \times 10^{-4}$ parts by weight per 100 parts by weight of the polycarbonate resin.

The polycarbonate resin composition may be a resin composition which contains, besides the additives shown above, various known additives such as, for example, a flame retardant, flame retardant aid, hydrolysis inhibitor, antistatic agent, blowing agent, dye or pigment, etc. so long as these additives do not defeat the objects of the invention. Furthermore, the polycarbonate resin composition may be a resin composition obtained by blending with a synthetic resin, e.g., an aromatic polycarbonate, aromatic polyester, polyamide, polystyrene, polyolefin, acrylic, or amorphous polyolefin, a biodegradable resin, e.g., poly(lactic acid) or poly(butylene succinate), or the like.

Examples of methods for mixing the polycarbonate resin composition with various additives such as those described above and with other ingredients include: a method in which the composition and other ingredients are mixed/kneaded by means of a tumbling mixer, twin-cylinder blender, supermixer, Nauta mixer, Banbury mixer, kneading rolls, extruder, or the like; and a solution blending method in which the composition and other ingredients are dissolved in a common good solvent, e.g., methylene chloride, and are mixed together in the solution state. However, mixing methods are not particularly limited, and any blending method in ordinary use may be used.

Various additives, etc. may be added to the polycarbonate resin thus obtained, and this polycarbonate resin can be molded into a desired shape by a generally known molding technique, e.g., extrusion molding, injection molding, or compression molding, either directly or after being temporarily pelletized with a melt extruder.

[Molded Polycarbonate Resin Article]

By molding the polycarbonate resin composition in the manner described above, a molded polycarbonate resin article can be obtained.

It is preferred that the molded polycarbonate resin article should be an article molded by injection molding.

In this case, a molded polycarbonate resin article having a complicated shape can be produced. Although molding into a complicated shape is apt to result in portions where stress concentration occurs, a rupture due to stress concentration can be inhibited because the effect of improving impact strength is obtained in the polycarbonate resin composition as described above.

(Second Aspect)

Embodiments of the second aspect of the invention will be explained below in detail. However, the following explanations on constituent elements are for embodiments (representative embodiments) of the second aspect of the invention, and the second aspect of the invention should not be construed as being limited to the following embodiments unless the second aspect departs from the essential points thereof. In this description, the symbol "-" is used as an expression which includes the numerical values or physical amounts that precede and succeed the symbol. When the term "substituent" is used in this description, the kind of the substituent is not limited unless otherwise indicated, and that term means a substituent having a molecular weight up to 200.

[Polycarbonate Resin Composition]

The polycarbonate resin composition according to the second aspect of the invention is characterized by including a polycarbonate resin which has structural units derived from a dihydroxy compound having the portion represented by the following general formula (1) (hereinafter often referred to as "dihydroxy compound (1)") and which has a glass transition temperature (Tig) lower than 145° C. and an impact strength modifier having a core/shell structure.

[Chem. 20]

 (1)

(The case where the portion represented by the general formula (1) is part of —CH$_2$—O—H is excluded.)

The second aspect of the invention is based on a finding that the effect of improving the percent brittle fracture, etc. as measured through an impact resistance test or sheet impact resistance test, the effect having been not obtained with the polycarbonate resin composition described in patent document 2, is obtained by blending a polycarbonate resin which has structural units derived from the dihydroxy compound (1) and which has a glass transition temperature (Tig) lower than 145° C. with an elastomer having a core/shell structure. Although the mechanism by which such an excellent improving effect is obtained has not been elucidated in detail, it is thought that by selecting the polycarbonate resin having a specific glass transition temperature (Tig), the elastomer having a core/shell structure is made to have enhanced dispersibility therein, thereby bringing about the effect.

[Polycarbonate Resin]

The polycarbonate resin to be used in the polycarbonate resin composition according to the second aspect of the invention (hereinafter, the polycarbonate resin is often referred to as "polycarbonate resin according to the invention") has structural units derived from a dihydroxy compound (dihydroxy compound (1)) having the portion represented by the following general formula (1) and has a glass transition temperature (Tig) lower than 145° C.

[Chem. 21]

 (1)

(The case where the portion represented by the general formula (1) is part of —CH$_2$—O—H is excluded.)

The polycarbonate resin according to the invention can be obtained by subjecting a dihydroxy compound (1) and a carbonic diester as starting materials to polycondensation by means of a transesterification reaction.

<Glass Transition Temperature (Tig)>

Although the polycarbonate resin according to the invention has a glass transition temperature (Tig) lower than 145° C., this glass transition temperature (Tig) is preferably 140° C. or lower, more preferably 135° C. or lower, even more preferably 130° C. or lower, but is preferably 70° C. or higher, more preferably 75° C. or higher, even more preferably 80° C. or higher. When a polycarbonate resin has too high a glass transition temperature, this means that this polycarbonate resin has too high a molecular weight (reduced viscosity). Because of this, this polycarbonate resin shows poor compatibility with elastomers and tends to give a polycarbonate resin composition in which the effect of improving the sheet impact resistance is insufficient. On the other hand, when a polycarbonate resin has too low a glass transition temperature, this means that this polycarbonate resin has too low heat resistance.

In the second aspect of the invention, the glass transition temperature (Tig) of a polycarbonate resin means the glass transition temperature measured by the following method.

(Measurement of Glass Transition Temperature (Tig))

Using a differential scanning calorimeter ("DSC 220", manufactured by SII Nano Technology Inc.), about 10 mg of the polycarbonate resin is heated at a heating rate of 10° C./min to determine a DSC curve. Subsequently, in accordance with JIS-K7121 (1987), the temperature corresponding to the intersection of the straight line drawn by extending the lower-temperature-side base line toward the higher-temperature side and the tangent which touches the stepwise changing part due to a glass transition at the point where the curve has a maximum slope is determined as an extrapolated glass transition initiation temperature. This temperature is taken as the glass transition temperature (Tig).

Although polycarbonate resins are usually produced using dihydroxy compounds and carbonic diesters as starting materials as stated above, usable carbonic diesters are limited. Consequently, it is usually thought that a method for regulating the polycarbonate resin according to the invention so as to have a glass transition temperature (Tig) lower than 145° C. is to select dihydroxy compounds to be used for producing the polycarbonate resin.

For example, an effective method may be to select a dihydroxy compound (1) which brings about a glass transition temperature lower than 145° C. Meanwhile, since a polycarbonate resin produced using isosorbide as the only dihydroxy compound (1) usually has a glass transition temperature higher than 145° C., an effective method for the case where isosorbide is used may be to copolymerize isosorbide with one or more other dihydroxy compounds while suitably selecting the kinds of the other dihydroxy compounds and the proportions thereof so that the glass transition temperature becomes lower.

In particular, it is desirable to select preferred compounds from the dihydroxy compounds described below in detail, which are for use as starting materials for the polycarbonate resin, and to use the selected compounds in preferred proportions.

<Starting Materials>
(Dihydroxy Compounds)

The dihydroxy compound (1) is not particularly limited so long as the compound has the portion represented by the formula (1) as part of the structure thereof. Examples thereof include oxyalkylene glycols such as diethylene glycol, triethylene glycol, and tetraethylene glycol, compounds which have an aromatic group as a side chain and have, in the main chain, ether groups each bonded to an aromatic group, such as 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene, and compounds having a cyclic ether structure, such as anhydrous sugar alcohols represented by dihydroxy compounds represented by the following formula (2), the spiro glycol represented by the following formula (5), and the dihydroxy compound represented by the following formula (6). Of these, diethylene glycol and triethylene glycol are preferred from the standpoints of availability, handling, reactivity during polymerization, and the hue of the polycarbonate resin to be obtained. Preferred from the standpoints of heat resistance and light resistance are dihydroxy compounds having a cyclic ether structure, such as sugar alcohols represented by the following formula (2), the spiro glycol represented by the following formula (5), and the dihydroxy compound represented by the following formula (6). More preferred are dihydroxy compounds which have a cyclic ether structure configured of a plurality of rings, preferably a cyclic ether structure configured of two rings, such as sugar alcohols represented by dihydroxy compounds represented by the following formula (2) and the spiro glycol represented by the following formula (5). Most preferred are anhydrous sugar alcohols represented by dihydroxy compounds represented by the following formula (2). These dihydroxy compounds may be used alone or in combination of two or more thereof in accordance with the performances required of the polycarbonate resin to be obtained.

[Chem. 22]

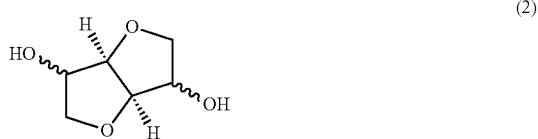

(2)

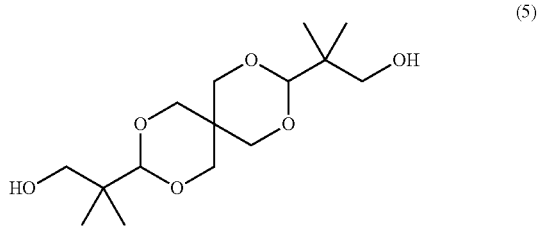

(5)

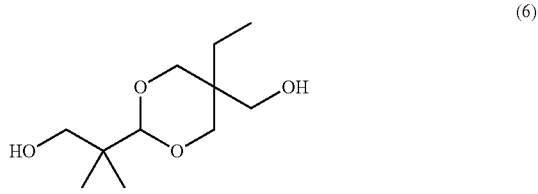

(6)

Examples of the dihydroxy compounds represented by the formula (2) include isosorbide, isomannide, and isoidide, which are stereoisomers. These compounds may be used alone or in combination of two or more thereof.

From the standpoint of the light resistance of the polycarbonate resin to be obtained, it is preferred to use dihydroxy compounds having no aromatic ring structure among those dihydroxy compounds (1). Most preferred of these dihydroxy compounds is isosorbide from the standpoints of availability, ease of production, light resistance, optical properties, moldability, heat resistance, and carbon neutrality. Isosorbide is obtained by the dehydrating condensation of sorbitol, which is produced from various starches that are plant-derived abundant resources and are easily available.

The proportion of structural units derived from the dihydroxy compound (1) to all structural units in the polycarbonate resin which each are derived from a dihydroxy compound is preferably 10 mol % or higher, more preferably 20 mol % or higher, even more preferably 30 mol % or higher. Meanwhile, the proportion of structural units derived from the dihydroxy compound (1) to all structural units in the polycarbonate resin which each are derived from a dihydroxy compound is 60 mol % or less, preferably 55 mol % or less. By regulating the content of structural units derived from the dihydroxy compound (1) to the given value, the polycarbonate resin is rendered excellent in terms of color tone, light resistance, etc.

It is preferred that the polycarbonate resin according to the invention should contain, besides the structural units derived from the dihydroxy compound (1), structural units derived from an aliphatic dihydroxy compound (dihydroxy compound in which the portion other than the two hydroxy groups is constituted of an aliphatic hydrocarbon), from the standpoint that the effect of improving sheet impact resistance and the effect of improving impact resistance are obtained after this polycarbonate resin is used to obtain the polycarbonate resin composition according to the second aspect of the invention. For obtaining the polycarbonate resin into which structural units derived from an aliphatic dihydroxy compound have been introduced, use may be made of a method in which copolymerization is conducted using the aliphatic dihydroxy compound as a starting material for the polycarbonate resin, as in the case of the dihydroxy compound (1).

Examples of the aliphatic dihydroxy compound include linear aliphatic dihydroxy compounds, branched aliphatic dihydroxy compounds, and alicyclic dihydroxy compounds. Preferred of these are alicyclic dihydroxy compounds.

Specific examples of the aliphatic dihydroxy compounds usable in the second aspect of the invention are shown below. The following aliphatic dihydroxy compounds can be used either alone or in combination of two or more thereof Examples of the linear aliphatic dihydroxy compounds include ethylene glycol, 1,3-propanediol, 1,2-propanediol, 1,4-butanediol, 1,3-butanediol, 1,2-butanediol, 1,5-heptanediol, 1,6-hexanediol, 1,10-decanediol, and 1,12-dodecanediol. Examples of the branched aliphatic dihydroxy compounds include neopentyl glycol and hexylene glycol.

The alicyclic dihydroxy compounds each are a compound which has a hydrocarbon framework of a cyclic structure and two hydroxy groups, in which the hydroxy groups may have been directly bonded to the cyclic structure or may have been bonded to the cyclic structure through substituents such as alkylene groups. The cyclic structure may be monocyclic or polycyclic. Suitable examples of the alicyclic dihydroxy compounds include the alicyclic dihydroxy compounds having a 5-membered cyclic structure which are shown below and the alicyclic dihydroxy compounds having a 6-membered cyclic structure which are shown below. By using an alicyclic dihydroxy compound having a 5-membered cyclic structure or an alicyclic dihydroxy compound having a 6-membered cyclic structure as an alicyclic dihydroxy compound to introduce structural units derived therefrom into a polycarbonate resin, the polycarbonate resin obtained can be made to have enhanced heat resistance.

The number of carbon atoms of such an alicyclic dihydroxy compound is generally 70 or less, preferably 50 or less, more preferably 30 or less. There is a tendency that the larger the number of carbon atoms thereof, the higher the heat resistance of the polycarbonate resin obtained. However, there are the cases where use of such an alicyclic dihydroxy compound results in difficulties in synthesizing or purifying the polycarbonate resin or results in an increased cost. On the other hand, the smaller the number of carbon atoms of the alicyclic dihydroxy compound, the easier the purification and the easier the starting-material procurement.

Examples of the alicyclic dihydroxy compounds having a 5-membered cyclic structure include tricyclodecanediols, pentacyclopentadecanediols, decalindiols such as 2,6-decalindiol, 1,5-decalindiol, and 2,3-decalindiol, tricyclotetradecanediols, tricyclodecanedimethanols, and pentacyclopentadecanedimethanols.

Examples of the alicyclic dihydroxy compounds having a 6-membered cyclic structure include cyclohexanediols such as 1,2-cyclohexanediol, 1,3-cyclohexanediol, 1,4-cyclohexanediol, 2-methyl-1,4-cyclohexanediol, and 2-methyl-1,4-cyclohexanediol, cyclohexenediols such as 4-cyclohexene-1,2-diol, norbornanediols such as 2,3-norbornanediol and 2,5-norbornanediol, adamantanediols such as 1,3-adamantanediol and 2,2-adamantanediol, cyclohexanedimethanols such as 1,2-cyclohexanedimethanol, 1,3-cyclohexanedimethanol, and 1,4-cyclohexanedimethanol, cyclohexenedimethanols such as 4-cyclohexene-1,2-diol, norbornanedimethanols such as 2,3-norbornanedimethanol and 2,5-norbornanedimethanol, and adamantanedimethanols such as 1,3-adamantanedimethanol and 2,2-adamantanedimethanol.

Preferred of the alicyclic dihydroxy compounds enumerated above are cyclohexanedimethanols, tricyclodecanedimethanols, adamantanediols, and pentacyclopentadecanedimethanols. Especially preferred are cyclohexanedimethanols and tricyclodecanedimethanaols.

When a cyclohexanedimethanol and/or a tricyclodecanedimethanol is used, a polycarbonate resin composition having excellent sheet impact resistance is obtained. Preferred of the cyclohexanedimethanols is 1,4-cyclohexanedimethanol.

By configuring the polycarbonate resin so as to contain both structural units derived from the dihydroxy compound (1) and structural units derived from an aliphatic dihydroxy compound, e.g., an alicyclic dihydroxy compound, not only the transparency and impact resistance of the polycarbonate resin can be improved but also the effect of improving various properties thereof, including flexibility, heat resistance, and moldability, can also be obtained.

In the case where the proportion of the structural units derived from an aliphatic dihydroxy compound, e.g., an alicyclic dihydroxy compound, in the polycarbonate resin according to the invention is too small, this polycarbonate resin tends to give a polycarbonate resin composition in which the elastomer shows poor dispersibility in the polycarbonate resin, making it difficult to obtain the effect of improving sheet impact resistance. On the other hand, in the case where the proportion thereof is too large, this polycarbonate resin has a heightened reduced viscosity and there is a possibility that the polycarbonate resin composition shows reduced flowability when being molded, resulting in impaired productivity and moldability. In particular, by regulating the proportion of the structural units derived from an aliphatic dihydroxy compound to all structural units in the polycarbonate resin which each are derived from a dihydroxy compound to 20 mol % or higher, the polycarbonate resin is made to give a polycarbonate resin composition which has excellent impact resistance. It is preferred that the proportion of the structural units derived from an aliphatic dihydroxy compound, e.g., an alicyclic dihydroxy compound, to all structural units in the polycarbonate resin which each are derived from a dihydroxy compound should be 40 mol % or higher, in particular, 45 mol % or higher. Meanwhile, the proportion of the structural units derived from an aliphatic dihydroxy compound, e.g., an alicyclic dihydroxy compound, to all structural units in the polycarbonate resin which each are derived from a dihydroxy compound is preferably 90 mol % or less, more preferably 80 mol % or less, even more preferably 70 mol % or less.

Incidentally, the polycarbonate resin according to the invention can contain structural units which can be regarded as both structural units derived from a dihydroxy compound (1) and structural units derived from an aliphatic dihydroxy compound. In the case where the polycarbonate resin contains such structural units, these structural units may be regarded, at will, as either structural units derived from a dihydroxy compound (1) or structural units derived from an alicyclic dihydroxy compound, so that the polycarbonate resin satisfies the requirement that the resin should have structural units derived from a dihydroxy compound (1) and have a glass transition temperature (Tig) lower than 145° C.

The polycarbonate resin according to the invention may contain structural units derived from a dihydroxy compound (hereinafter often referred to as "other dihydroxy compound") other than both the dihydroxy compound (1) and the aliphatic dihydroxy compounds.

Specific examples of the other dihydroxy compound include aromatic bisphenol compounds such as 2,2-bis(4-hydroxyphenyl)propane[=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxydiphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl) sulfone, 2,4'-dihydroxydiphenyl sulfone, bis(4-hydroxyphenyl) sulfide, 4,4'-dihydroxydiphenyl ether, 4,4'-dihydroxy-3,3'-dichlorodiphenyl ether, 9,9-bis(4-hydroxyphenyl)fluorene, and 9,9-bis(4-hydroxy-2-methylphenyl)fluorene. However, from the standpoint of the light resistance of the polycarbonate resin, the other dihydroxy compounds preferably are dihydroxy compounds each having no aromatic ring structure in the molecular structure. With respect to those other dihydroxy compounds also, one compound may be used alone or two or more compounds may be used in combination, according to the performances required of the polycarbonate resin to be obtained.

In the case where the polycarbonate resin according to the invention contains structural units derived from other dihydroxy compound, the proportion of the structural units derived from other dihydroxy compound to all structural units in the polycarbonate resin which each are derived from a dihydroxy compound is the same as in the polycarbonate resin to be used in the polycarbonate resin composition according to the first aspect of the invention.

The dihydroxy compounds to be used for producing the polycarbonate resin according to the invention may contain stabilizers such as a reducing agent, antioxidant, deoxidizer, light stabilizer, antacid, pH stabilizer, and heat stabilizer. These stabilizers are the same as in the polycarbonate resin to be used in the polycarbonate resin composition according to the first aspect of the invention.

(Carbonic Diester)

The polycarbonate resin according to the invention can be obtained by subjecting one or more dihydroxy compounds including the dihydroxy compound (1) described above and a carbonic diester represented by the formula (4) as starting materials to polycondensation by means of a transesterification reaction. Techniques concerning the carbonic diester to be used in this case are the same as in the polycarbonate resin to be used in the polycarbonate resin composition according to the first aspect of the invention.

<Transesterification Reaction Catalyst>

Although the polycarbonate resin according to the invention is usually produced by subjecting one or more dihydroxy compounds including the dihydroxy compound (1) to a transesterification reaction with a carbonic diester represented by the formula (4), techniques concerning the transesterification reaction catalyst to be used in this case are the same as in the polycarbonate resin to be used in the polycarbonate resin composition according to the first aspect of the invention.

<Process for Producing the Polycarbonate Resin>

Although the polycarbonate resin according to the invention is produced by subjecting one or more dihydroxy compounds including the dihydroxy compound (1) to a transesterification reaction with a carbonic diester represented by the formula (4), techniques concerning the polycarbonate resin production process in this case are the same as in the polycarbonate resin to be used in the process for producing the polycarbonate resin composition according to the first aspect of the invention.

<Properties of the Polycarbonate Resin>

Various properties of the polycarbonate resin according to the invention are the same as in the polycarbonate resin to be used in the polycarbonate resin composition according to the first aspect of the invention.

Incidentally, the reduced viscosity of the polycarbonate resin according to the second aspect of the invention is determined by using methylene chloride as a solvent to prepare a solution having a polycarbonate resin concentration precisely regulated to 0.6 g/dL and measuring the viscosity thereof at a temperature of 20.0±0.1° C. using an Ubbelohde viscometer.

Furthermore, the lower limit of the concentration of the end group represented by the following formula (8) in the polycarbonate resin according to the second aspect of the invention is generally 20 μeq/g, preferably 40 μeq/g, especially preferably 50 μeq/g. The upper limit thereof is generally 160 μeq/g, preferably 140 μeq/g, especially preferably 100 μeq/g.

[Chem. 23]

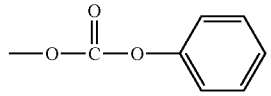

(8)

In the case where the concentration of the end group represented by the formula (8) in the polycarbonate resin is too high, there is a possibility that even when the polycarbonate resin has a satisfactory hue immediately after polymerization or during molding, the high end group concentration might result in a hue deterioration through exposure to ultraviolet rays. Conversely, in the case where the concentration thereof is too low, there is a possibility that this polycarbonate resin might have reduced thermal stability.

Examples of methods for regulating the concentration of the end group represented by the formula (8) include: to regulate the molar proportions of the starting materials, i.e., one or more dihydroxy compounds including the dihydroxy compound (1) and a carbonic diester represented by the formula (4); and to control a factor in the transesterification reaction, such as the kind or amount of a catalyst, polymerization pressure, or polymerization temperature.

When the number of moles of the hydrogen bonded to the aromatic rings of the polycarbonate resin according to the invention is expressed by "X" and the number of moles of the H bonded to the part other than the aromatic rings is expressed by "Y", then the ratio of the number of moles of the hydrogen bonded to the aromatic rings to the number of moles of all hydrogen is expressed by X/(X+Y). Since there is a possibility that the aromatic rings, which have ultraviolet-absorbing ability, might affect light resistance as stated above, it is preferred that X/(X+Y) in the polycarbonate resin according to the invention should be 0.1 or less. The value of X/(X+Y) is more preferably 0.05 or less, even more preferably 0.02 or less, especially preferably 0.01 or less. The value of X/(X+Y) of a polycarbonate resin can be determined by 1H-NMR spectroscopy.

[Elastomer]

The polycarbonate resin composition according to the second aspect of the invention is characterized by including the polycarbonate resin according to the invention described above and an elastomer (impact strength modifier) having a core/shell structure. In this description, the term "elastomer having a core/shell structure" means a core/shell type graft copolymer which is configured of innermost layers (core layers) and one or more layers (shell layer) that cover each core layer and which has been obtained by graft-copolymerizing, as the shell layers, a copolymerizable monomer ingredient with the core layers.

It is usually preferred that the elastomer having a core/shell structure to be used in the second aspect of the invention should be a core/shell type graft copolymer obtained by using as core layers a polymer ingredient which is called a rubber ingredient and graft-copolymerizing as shell layers a monomer ingredient which is copolymerizable with the polymer ingredient.

For producing this core/shell type graft copolymer, use may be made of any production process selected from bulk polymerization, solution polymerization, suspension polymerization, emulsion polymerization, and the like. The mode of copolymerization operation may be either single-stage grafting or multistage grafting. In the second aspect of the invention, commercially available core/shell type elastomers can usually be used as such. Examples of the commercially available core/shell type elastomers will be enumerated later.

The polymer ingredient which forms the core layers has a glass transition temperature of generally 0° C. or lower, preferably −10° C. or lower, more preferably −20° C. or lower, even more preferably −30° C. or lower. Examples of the polymer ingredient which forms the core layers include polybutadiene, polyisoprene, poly(alkyl acrylate)s such as poly(butyl acrylate), poly(2-ethylhexyl acrylate), and butyl acrylate/2-ethylhexyl acrylate copolymers, silicone rubbers such as polyorganosiloxane rubbers, butadiene/acrylic composites, IPN (interpenetrating polymer network) type composite rubbers constituted of a polyorganosiloxane rubber and a poly(alkyl acrylate) rubber, styrene/butadiene copolymers, ethylene/α-olefin copolymers such as ethylene/propylene copolymers, ethylene/butene copolymers, and ethylene/octene copolymers, ethylene/acrylic copolymers, and fluororubbers. These polymers may be used alone or as a mixture of two or more thereof. Preferred of these from the standpoints of mechanical properties and surface appearance are polybutadiene, poly(alkyl acrylate)s, polyorganosiloxanes, composites constituted of a polyorganosiloxane and a poly(alkyl acrylate), and butadiene/styrene copolymers.

Examples of the monomer ingredient which is graft-copolymerizable with the polymer ingredient of the core layers and which constitutes the shell layers include: aromatic vinyl compounds, vinyl cyanide compounds, (meth)acrylic ester compounds, (meth)acrylic acid compounds, and epoxy-group-containing (meth)acrylic ester compounds such as glycidyl(meth)acrylate; maleimide compounds such as maleimide, N-methylmaleimide, and N-phenylmaleimide; and α,β-unsaturated carboxylic acid compounds, such as maleic acid, fumaric acid, and itaconic acid, and anhydrides thereof (e.g., maleic anhydride). One of these monomer ingredients may be used alone, or two or more thereof may be used in combination. Preferred of these from the standpoints of mechanical properties and surface appearance are aromatic vinyl compounds, vinyl cyanide compounds, (meth)acrylic ester compounds, and (meth)acrylic acid compounds. More preferred are (meth)acrylic ester compounds. Examples of the (meth) acrylic ester compounds include methyl(meth)acrylate, ethyl (meth)acrylate, butyl(meth)acrylate, cyclohexyl(meth)acrylate, and octyl(meth)acrylate. Preferred of these are methyl (meth)acrylate and ethyl(meth)acrylate, which are relatively easily available. More preferred is methyl(meth)acrylate. The term "(meth)acrylic" or "(meth)acrylate" as used herein inclusively means "acrylic" and "methacrylic" or inclusively means "acrylate" and "methacrylate".

It is especially preferred that the elastomer having a core/shell structure, which is to be used in the second aspect of the invention, should be a core/shell type graft copolymer configured of: core layers made of at least one polymer ingredient selected from a polybutadiene-containing rubber, a poly(butyl acrylate)-containing rubber, a polyorganosiloxane rubber, and an IPN type composite rubber constituted of a polyorganosiloxane rubber and a poly(alkyl acrylate) rubber; and shell layers formed on the periphery of the core layers by graft-copolymerizing a (meth)acrylic ester. In the core/shell type graft copolymer, the content of the polymer ingredient constituting the core layers is preferably 40% by weight or higher, more preferably 60% by weight or higher. Furthermore, the content therein of the (meth)acrylic ester ingredient constituting the shell layers is preferably 10% by weight or higher.

Preferred examples of such core/shell type graft copolymers include methyl methacrylate/butadiene/styrene copolymers (MBS), methyl methacrylate/acrylonitrile/butadiene/styrene copolymers (MABS), methyl methacrylate/butadiene copolymers (MB), methyl methacrylate/acrylic rubber copolymers (MA), methyl methacrylate/acrylic rubber/styrene copolymers (MAS), methyl methacrylate/acrylic-butadiene rubber copolymers, methyl methacrylate/acrylic-butadiene rubber/styrene copolymers, and methyl methacrylate/ (acrylic-silicone composite) copolymers.

Examples of such core/shell type graft copolymers include: "Paraloid (registered trademark) EXL 2602", "Paraloid (registered trademark) EXL 2603", "Paraloid (registered trademark) EXL 2655", "Paraloid (registered trademark) EXL 2311", "Paraloid (registered trademark) EXL 2313", "Paraloid (registered trademark) EXL 2315", "Paraloid (registered trademark) KM 330", "Paraloid (registered trademark) KM 336P", and "Paraloid (registered trademark) KCZ 201", all manufactured by Rohm & Hass Japan K.K.; "Metablen (registered trademark) C-223A", "Metablen (registered trademark) E-901", "Metablen (registered trademark) S-2001", "Metablen (registered trademark) W-450A", and "Metablen (registered trademark) SRK-200", all manufactured by Mitsubishi Rayon Co., Ltd.; and "Kane Ace (registered trademark) M-511", "Kane Ace (registered trademark) M-600", "Kane Ace (registered trademark) M-400", "Kane Ace (registered trademark) M-580", and "Kane Ace (registered trademark) MR-01", all manufactured by Kaneca Corp.

One of such elastomers having a core/shell structure, e.g., those core/shell type graft copolymers, may be used alone, or two or more thereof may be used in combination.

In the polycarbonate resin composition according to the second aspect of the invention, the amount of the elastomer having a core/shell structure, such as those described above, which is contained per 100 parts by weight of the polycarbonate resin according to the invention is preferably 0.05-50 parts by weight, more preferably 0.1 part by weight or more, even more preferably 0.5 parts by weight or more. Meanwhile, the amount thereof is more preferably 40 parts by weight or less, even more preferably 30 parts by weight or less, especially preferably 25 parts by weight or less. In the case where the elastomer having a core/shell structure is incorporated in too large an amount, this polycarbonate resin composition tends to give molded articles which have an appearance failure and reduced heat resistance. On the other hand, in the case where the incorporation amount thereof is too small, the effect of improving sheet impact resistance and impact resistance is less apt to be produced.

[Antioxidant]

It is preferred that the polycarbonate resin composition according to the second aspect of the invention should further contain an antioxidant. Techniques concerning the use of an antioxidant are the same as in the polycarbonate resin composition according to the first aspect of the invention.

[Release Agent]

It is preferred that the polycarbonate resin composition according to the second aspect of the invention should contain a release agent. Techniques concerning the use of a release agent are the same as in the polycarbonate resin composition according to the first aspect of the invention.

[Other Resins]

Resins other than polycarbonate resins (hereinafter often referred to simply as "other resins") can be used in the polycarbonate resin composition according to the second aspect of the invention for the purpose of further improving or regulating the moldability or other various properties. Examples of the other resins include polyester resins, polyethers, polyamides, polyolefins, and rubbery modifiers such as linear random and block copolymers. The term "rubbery modifiers" does not include the "elastomer" as used in this description.

In the case where other resins are to be incorporated, the amount of these resins to be incorporated is preferably 1-30% by weight, more preferably 3-20% by weight, even more preferably 5-10% by weight, based on the whole polycarbonate resin composition according to the second aspect of the invention.

[Filler]

It is possible to suitably incorporate a filler, acidic compound, ultraviolet-ray absorption aid, bluing agent, heat stabilizer, light stabilizer, antistatic agent, etc. into the polycarbonate resin composition according to the second aspect of the invention so long as the incorporation thereof does not defeat the objects of the invention. It should, however, be noted that the ingredients shown below are representative examples of usable ingredients, and the incorporation of ingredients other than those enumerated below should not be precluded.

A filler can be incorporated into the polycarbonate resin composition according to the second aspect of the invention so long as the incorporation thereof does not defeat the objects of the invention. Examples of fillers which can be incorporated into the polycarbonate resin composition according to the second aspect of the invention include inorganic fillers and organic fillers.

The amount of the filler to be incorporated is 0-100% by weight based on the whole polycarbonate resin composition. The amount of the filler to be incorporated is preferably 50% by weight or less, more preferably 40% by weight or less, even more preferably 35% by weight or less. Although the incorporation of a filler produces the effect of reinforcing the polycarbonate resin composition, too large incorporation amounts thereof tend to result in molded articles which have an impaired appearance.

Examples of the inorganic fillers include glass fibers, milled glass fibers, glass flakes, glass beads, silica, alumina, titanium oxide, calcium sulfate powder, gypsum, gypsum whiskers, barium sulfate, talc, mica, calcium silicate such as wollastonite, carbon black, graphite, iron powder, copper powder, molybdenum disulfide, silicon carbide, silicon carbide fibers, silicon nitride, silicon nitride fibers, brass fibers, stainless-steel fibers, potassium titanate fibers, and whiskers of these substances. Preferred of these are the fibrous fillers of glass, the powdery filler of glass, the flaky filler of glass, the various whiskers, mica, and talc. More preferred are glass fibers, glass flakes, milled glass fibers, wollastonite, mica, and talc. Especially preferred are glass fibers and/or talc. Although one of the inorganic fillers enumerated above can be used alone, two or more thereof may be used in combination.

As the glass fibers or milled glass fibers, any glass fibers or milled glass fibers which are in use in thermoplastic resins can be used. However, fibers or milled fibers which are made of an alkali-free glass (E-glass) are especially preferred. The diameter of the glass fibers is preferably 6-20 µm, more preferably 9-14 µm. In the case where the diameter of the glass fibers is too small, the reinforcing effect tends to be insufficient. In the case where the diameter thereof is too large, these glass fibers are apt to adversely affect the appearance of the molded articles to be obtained.

Preferred examples of the glass fibers include chopped strands which have been cut into a length of 1-6 mm and milled glass fibers which are on the market in the form of fibers pulverized to a length of 0.01-0.5 mm. These two fillers may be used alone or as a mixture thereof.

The glass fibers may be subjected, before being used, to a surface treatment with, for example, a silane coupling agent such as an aminosilane or an epoxysilane in order to improve adhesion to the polycarbonate resin, or to a sizing treatment with an acrylic resin, urethane resin, or the like in order to improve handleability.

As the glass beads, any glass beads which are in use in thermoplastic resins can be used. Preferred of these are beads made of an alkali-free glass (E-glass). Preferred glass beads are spherical beads having a diameter of 10-50 µm.

Examples of the glass flakes include flaky glass flakes. The glass flakes, after having been incorporated into the polycarbonate resin composition, have a major-axis length of generally 1,000 µm or less, preferably 1-500 µm, and an aspect ratio (ratio between major-axis length and thickness) of generally 5 or larger, preferably 10 or larger, more preferably 30 or larger.

Examples of the organic fillers include: powdery organic fillers such as wood flour, bamboo flour, coconut starch, cork powder, and pulp powder; organic fillers of a balloon shape of spherical shape which are made of crosslinked polyesters, polystyrene, styrene/acrylic copolymers, urea resins, or the like; and fibrous organic fillers such as carbon fibers, synthetic fibers, and natural fibers.

The carbon fibers are not particularly limited, and examples thereof include various kinds of carbon fibers, including flame-resistant, carbonaceous, and graphitic carbon fibers, produced by burning acrylic fibers, special petroleum or coal pitch, cellulose fibers, lignin, etc. as raw materials. The carbon fibers have an average aspect ratio (fiber length/fiber diameter) of preferably 10 or higher, more preferably 50 or higher. In the case where the average aspect ratio thereof is too small, the polycarbonate resin composition tends to be reduced in electrical conductivity, strength, and rigidity. The carbon fibers have a diameter of 3-15 µm. Carbon fibers having any shape such as, for example, chopped strands, roving strands, or milled fibers can be used in order to regulate the aspect ratio thereof to that value. One kind of carbon fibers or a mixture of two or more kinds of carbon fibers can be used.

The carbon fibers may be subjected to a surface treatment such as, for example, an epoxy treatment, urethane treatment, or oxidation treatment in order to enhance the affinity for the polycarbonate resin, unless the treatment impairs the properties of the polycarbonate resin composition according to the second aspect of the invention.

[Acidic Compound or Derivative Thereof]

The polycarbonate resin composition according to the second aspect of the invention may further contain an acidic compound or a derivative thereof In the case where an acidic compound or a derivative thereof is used, the amount of the acidic compound or derivative thereof to be incorporated, based on the whole polycarbonate resin composition, is 0.00001-0.1% by weight, preferably 0.0001-0.01% by weight, more preferably 0.0002-0.001% by weight. When the acidic compound or derivative thereof is incorporated in an amount not less than the lower limit, such an incorporation amount is preferred from the standpoint of preventing coloring when the polycarbonate resin composition is subjected to injection molding and stagnates in the injection molding machine for a prolonged period. However, when the acidic compound or derivative thereof is incorporated in too large an amount, there are the cases where the polycarbonate resin composition has reduced hydrolytic resistance.

Examples of the acidic compound or derivative thereof include BrØnsted acids such as hydrochloric acid, nitric acid, boric acid, sulfuric acid, sulfurous acid, phosphoric acid, phosphorous acid, hypophosphorous acid, polyphosphoric acid, adipic acid, ascorbic acid, aspartic acid, azelaic acid, adenosine phosphate, benzoic acid, formic acid, valeric acid, citric acid, glycolic acid, glutamic acid, glutaric acid, cinnamic acid, succinic acid, acetic acid, tartaric acid, oxalic acid, p-toluenesulfinic acid, p-toluenesulfonic acid, naphthalenesulfonic acid, nicotinic acid, picric acid, picolinic acid, phthalic acid, terephthalic acid, propionic acid, benzenesulfinic acid, benzenesulfonic acid, malonic acid, and maleic acid and esters thereof. Preferred of these acidic compounds or derivatives thereof are the sulfonic acids or esters thereof. Especially preferred of these are p-toluenesulfonic acid, methyl p-toluenesulfonate, and butyl p-toluenesulfonate.

These acidic compounds or derivatives thereof can be added, in steps for producing the polycarbonate resin composition, as compounds for neutralizing the basic transesterification catalyst used in the polycondensation reaction for polycarbonate resin production described above.

[Ultraviolet Absorber]

An ultraviolet absorber can be incorporated into the polycarbonate resin composition according to the second aspect of the invention so long as the incorporation thereof does not defeat the objects of the invention. Techniques concerning the use of an ultraviolet absorber are the same as in the polycarbonate resin composition according to the first aspect of the invention.

[Bluing Agent]

A bluing agent can be incorporated into the polycarbonate resin composition according to the second aspect of the invention in order to eliminate the yellowness of molded articles which is attributable to the polycarbonate resin or the ultraviolet absorber. Techniques concerning the use of a bluing agent are the same as in the polycarbonate resin composition according to the first aspect of the invention.

[Light Stabilizer]

A light stabilizer can be incorporated into the polycarbonate resin composition according to the second aspect of the invention for the purpose of further improving the light resistance of the polycarbonate resin composition and molded polycarbonate resin article according to the second aspect of the invention.

Examples of the light stabilizer include bis(2,2,6,6-tetramethyl-4-piperidyl) sebacate, bis(1,2,2,6,6-pentamethyl-4-piperidyl) sebacate, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], N,N'-bis(3-aminopropyl)ethylenediamine-2,4-bis[N-butyl-N-(1,2,2,6,6-pentamethyl-4-piperidylamino)-6-chloro-1,3,5-triazine condensates, and polycondensates of dibutylamine, 1,3,5-triazine, or N,N'-bis(2,2,6,6)-tetramethyl-4-piperidyl-1,6-hexamethylenediamine with N-(2,2,6,6-tetramethyl-4-piperidyl)butylamine. Preferred of these are bis(2,2,6,6-tetramethyl-4-piperidyl) sebacate and bis(1,2,2,6,6-pentamethyl-4-piperidyl) sebacate.

In the case where such a light stabilizer is used, the light stabilizer can be incorporated in a proportion of 0-2% by weight based on the whole polycarbonate resin composition according to the second aspect of the invention. The proportion in which the light stabilizer is incorporated is preferably 0.005-0.5% by weight, more preferably 0.01-0.2% by weight. By incorporating a light stabilizer in an amount within that range, the light resistance of molded articles obtained by molding the polycarbonate resin composition according to the second aspect of the invention can be improved while preventing the light stabilizer from bleeding to the surface of the polycarbonate resin composition and while preventing the resultant molded articles from having reduced mechanical properties.

[Other Additives]

An antistatic agent can be further incorporated into the polycarbonate resin composition according to the second aspect of the invention so long as this incorporation does not defeat the objects of the invention. Furthermore, various additives other than those described above, such as a heat stabilizer, colorant, lubricant, plasticizer, compatibilizing agent, flame retardant, flame-retardant aid, hydrolysis inhibitor, antistatic agent, blowing agent, etc., may be incorporated into the polycarbonate resin composition according to the second aspect of the invention so long as this incorporation does not defeat the objects of the invention.

[Time of Adding Various Additives and Methods of Addition]

The time of adding the various additives described above, e.g., an antioxidant, release agent, filler, acidic compound or derivative thereof, ultraviolet-ray absorption aid, bluing agent, heat stabilizer, light stabilizer, and antistatic agent, to the polycarbonate resin composition and methods for the addition are not particularly limited. Examples of the time of addition include the time when polymerization reaction is completed, in the case where the polycarbonate resin was produced by a transesterification method. Examples thereof further include, regardless of polymerization method: the time when the polycarbonate resin or the polycarbonate resin composition is in a molten state, for example, during kneading of the polycarbonate resin and other ingredients; and the time when the polycarbonate resin composition in a solid state, e.g., in a pellet or powder form, is blended with other ingredients and kneaded using an extruder or the like. Examples of addition methods include: a method in which various ingredients are directly incorporated, through mixing or kneading, into the polycarbonate resin; and a method in which various additives are added in the form of a high-concentration master batch produced using the various ingredients and a small amount of the polycarbonate resin composition, another resin, etc.

[Production Process]

The polycarbonate resin composition according to the second aspect of the invention can be produced by mixing the polycarbonate resin according to the invention with the elastomer having a core/shell structure and with optional raw materials, e.g., other resins and various additives, by means of a tumbling mixer, supermixer, floating mixer, twin-cylinder mixer, Nauta mixer, Banbury mixer, or extruder either simultaneously or in any desired order.

[Molded Polycarbonate Resin Article]

The molded polycarbonate resin article according to the second aspect of the invention is obtained by molding the polycarbonate resin composition according to the second aspect of the invention.

The molded polycarbonate resin article according to the second aspect of the invention can be produced by directly mixing raw materials including the polycarbonate resin and the elastomer and optionally further including other resins, additives, etc. and introducing the mixture into an extruder or an injection molding machine to mold the mixture. Alternatively, the molded article can be produced by melt-mixing the raw materials using a twin-screw extruder, extruding the melt into a strand form and pelletizing the extrudate, and thereafter introducing the pellets into an extruder or an injection molding machine to mold the composition.

Molding techniques are not particularly limited, and a generally known molding technique, e.g., injection molding, extrusion molding, or compression molding, can be employed. However, injection molding is preferred from the standpoint of the degree of freedom of the shape of the molded article.

The molded polycarbonate resin article according to the second aspect of the invention, which is obtained by molding the polycarbonate resin composition according to the second aspect of the invention, is excellent especially in terms of sheet impact resistance, impact resistance, and the like. This molded article is hence suitable for use as OA or electronic/electrical parts, the housings of precision mechanical parts, and interior or exterior automotive parts.

(Third Aspect)

An explanation is given below on a polycarbonate resin composition (hereinafter suitably referred to simply as "resin composition") as one embodiment of the third aspect of the invention. It should, however, be noted that the scope of the third aspect of the invention is not limited to the embodiment explained below.

In this description, the expression "comprises as a main component" means that other ingredients may be contained so long as the incorporation thereof does not lessen the effects of the resins which constitute the resin composition. Furthermore, although that expression is not intended to limit the content to a specific value, the component may account for 50% by mass or more, preferably 60% by mass or more, more preferably 70% by mass or more, but not more than 100% by mass of all components of the resin composition.

<Polycarbonate Resin (A)>

As the polycarbonate resin (A) for the third aspect of the invention, use is made of a polycarbonate resin which contains constituent units (a) derived from a dihydroxy compound having the portion represented by the following general formula (1) as part of the structure thereof.

[Chem. 24]

(1)

(The case where the portion represented by the general formula (1) is part of —$CH_2$—O—H is excluded.) Namely, the dihydroxy compound is a compound which at least contains two hydroxyl groups and further contains the portion of the general formula (1).

The dihydroxy compound having the portion represented by the general formula (1) as part of the structure thereof is not particularly limited so long as part of the molecular structure thereof is represented by the general formula (1). Specific examples thereof include compounds which have an aromatic group as a side chain and have, in the main chain, ether groups each bonded to an aromatic group, such as 9,9-bis(4-(2-hydroxyethoxy)phenyl)fluorene, 9,9-bis(4-(2-hydroxyethoxy)-3-methylphenyefluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene, and compounds having a cyclic ether structure, such as anhydrous sugar alcohols represented by dihydroxy compounds represented by the following general formula (2) and spiro glycols represented by the following general formula (3). Examples of the dihydroxy compounds represented by the following general formula (2) include isosorbide, isomannide, and isoidide, which are stereoisomers. Examples of the dihydroxy compounds represented by the following general formula (3) include 3,9-bis(1,1-dimethyl-2-hydroxyethyl)-2,4,8,10-tetraoxaspiro(5.5)undecane (common name, spiro glycol), 3,9-bis(1,1-diethyl-2-hydroxyethyl)-2,4,8,10-tetraoxaspiro(5.5)undecane, and 3,9-bis(1,1-dipropyl-2-hydroxyethyl)-2,4,8,10-tetraoxaspiro(5.5)undecane.

One of these compounds may be used alone, or two or more thereof may be used in combination.

[Chem. 25]

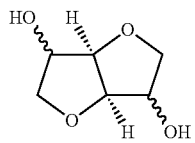
(2)

[Chem. 26]

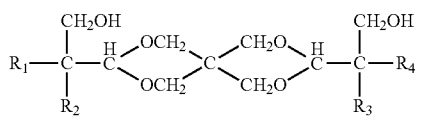
(3)

(In the general formula (3), $R_1$ to $R_4$ each independently are an alkyl group having 1-3 carbon atoms.)

Most preferred of those compounds is isosorbide, which is a plant-derived compound and is easily available industrially. Those compounds may be used alone or in combination of two or more thereof.

It is important that the polycarbonate resin (A) to be used in the third aspect of the invention should contain structural units (b) derived from an alicyclic dihydroxy compound, as structural units other than the structural units (a). The proportion of the structural units (b) to the polycarbonate resin (A) is not particularly limited. From the standpoint of heat resistance, however, the proportion thereof is preferably 30-80% by mole, more preferably 40-80% by mole, even more preferably 50-80% by mole. By regulating the proportion of the structural units (b) to a value within that range, the polycarbonate resin (A) can be prevented from having reduced heat resistance or being too flexible and can be rendered usable in a wider range of applications.

Preferred of alicyclic dihydroxy compounds is 1,4-cyclohexanedimethanol, which is easily available industrially.

Furthermore, the polycarbonate resin (A) to be used in the third aspect of the invention can contain structural units other than the structural units (a) and structural units (b). Examples thereof include structural units derived from any of the aliphatic dihydroxy compounds shown in International Publication No. 2004/111106 and structural units derived from any of the alicyclic dihydroxy compounds shown in International Publication No. 2007/148604.

It is preferred that the polycarbonate resin (A) should contain structural units derived from at least one compound selected from ethylene glycol, 1,3-propanediol, 1,4-butanediol, 1,5-pentadiol, and 1,6-hexanediol, among structural units derived from the aliphatic dihydroxy compounds enumerated above.

Preferred of structural units derived from the alicyclic dihydroxy compounds shown above are structural units which contain a 5-membered cyclic structure or 6-membered cyclic structure. The 6-membered cyclic structure may be in a chair or boat form which has been fixed by means of covalent bonding. When the polycarbonate obtained contains structural units derived from an alicyclic dihydroxy compound having a 5-membered cyclic structure or 6-membered cyclic structure, this polycarbonate can have enhanced heat resistance. The number of the carbon atoms contained in the alicyclic dihydroxy compound is generally 70 or less, preferably 50 or less, more preferably 30 or less.

Examples of the alicyclic dihydroxy compound which contains a 5-membered cyclic structure or 6-membered cyclic structure include the alicyclic dihydroxy compounds shown in International Publication No. 2007/148604, which was cited above. Preferred examples thereof include tricyclodecanedimethanol, adamantanediol, and pentacyclopentadecanedimethanol. One of these compounds may be used alone, or two or more thereof may be used in combination.

The reduced viscosity of the polycarbonate resin (A), which is an index to the molecular weight thereof, is determined by using methylene chloride as a solvent to prepare a solution having a polycarbonate concentration precisely regulated to 0.60 g/dL and measuring the viscosity thereof at a temperature of $20.0\pm0.1°$ C. The reduced viscosity thereof is in the range of generally 0.20-1.0 dL/g, preferably 0.30-0.80 dL/g.

When the reduced viscosity of the polycarbonate resin (A) is 0.20 dL/g or higher, the resin composition according to the third aspect of the invention, when being molded into various shapes, gives molded articles having sufficient mechanical strength. Such reduced viscosities thereof are hence preferred. When the reduced viscosity of the polycarbonate resin (A) is 1.0 dL/g or less, the resin composition shows satisfactory flowability when being molded, and this not only results in an improvement in productivity but also is less apt to result in appearance failures, e.g., flow marks. Such reduced viscosities thereof are hence preferred.

The polycarbonate resin (A) can be produced by a polymerization method in general use, and either the phosgene method or the transesterification method in which dihydroxy compounds are reacted with a carbonic diester may be used. Preferred of these is the transesterification method in which a dihydroxy compound having the portion represented by the general formula (1) as part of the structure thereof, cyclohexanedimethanol, and other dihydroxy compounds which are used according to need are reacted with a carbonic diester in the presence of a polymerization catalyst. The transesterification method is a production process in which the dihydroxy compound having the portion represented by the general formula (1) as part of the structure thereof, cyclohexanedimethanol, other dihydroxy compounds which are used according to need, and a carbonic diester are subjected to a transesterification reaction in the presence of both a basic catalyst and an acidic substance for neutralizing the basic catalyst.

Representative examples of the carbonic diester include diphenyl carbonate, ditolyl carbonate, bis(chlorophenyl) carbonate, m-cresyl carbonate, dinaphthyl carbonate, bis(biphenyl) carbonate, diethyl carbonate, dimethyl carbonate, dibutyl carbonate, and dicyclohexyl carbonate. Especially preferred of these is diphenyl carbonate.

<Flexible Styrene-Based Resin (B)>

The flexible styrene-based resin (B) to be used in the third aspect of the invention is a block copolymer including a styrene polymer block and a conjugated-diene-based polymer block, and it is important that the content of styrene in the flexible styrene-based resin (B) should be 10-40% by mass. The lower limit of the content thereof is more preferably 15% by mass, even more preferably 20% by mass. The upper limit of the content thereof is more preferably 35% by mass, even more preferably 30% by mass.

When the styrene content is within that range, it is possible to impart excellent impact resistance.

The conjugated-diene-based polymer block to be used in the flexible styrene-based resin (B) can be a homopolymer of butadiene, isoprene, 1,3-pentadiene, or the like, a copolymer of these, a copolymer which contains, within the block, a monomer that is copolymerizable with the conjugated diene monomer(s), or the like. Specific examples thereof include styrene/butadiene/styrene block copolymers (SBS) and styrene/isoprene/styrene block copolymers (SIS). Specific examples of the merchandise include "Kraton D" series, manufactured by Kraton Polymers Inc., and "AR-100" series, manufactured by Aron Kasei Co., Ltd.

Incidentally, the block copolymers include pure blocks, random blocks, tapered blocks, etc., and are not particularly limited in the mode of copolymerization. With respect to the block units, each unit may be repeated many times. Specifically, in the case of a styrene/butadiene block copolymer, each block unit may be repeated many times, as in a styrene/butadiene copolymer, a styrene/butadiene/styrene block copolymer, and a styrene/butadiene/styrene/butadiene block copolymer.

Furthermore, use can be made of a hydrogenated styrene/butadiene/styrene block copolymer (SEBS) and a hydrogenated styrene/isoprene/styrene block copolymer (SEPS) which were obtained by partly or wholly hydrogenating the double bonds of the conjugated-diene-based polymer blocks of the SBS and SIS, respectively. Specific examples of the merchandise include "Tuftec H" series, manufactured by Asahi Kasei Chemicals, Inc., and "Kraton G" series, manufactured by Kraton Polymers Inc.

In addition, it is also possible to impart functional groups having polarity to the flexible styrene-based resin. Examples of the functional groups having polarity include acid anhydride groups, carboxy group, carboxylic acid ester groups, carbonyl chloride groups, carbonamide groups, carboxylic acid salt groups, sulfo group, sulfonic acid ester groups, sulfonyl chloride groups, sulfonamide groups, sulfonic acid salt groups, epoxy group, amino group, imido groups, and oxazoline groups.

It is preferred to impart acid anhydride groups or epoxy groups among those groups. Especially preferred among the acid anhydride groups is the functional group derived from maleic anhydride. By imparting such functional groups, compatibility between the polycarbonate resin (A) and the flexible styrene-based resin (B) is improved and the flexible styrene-based resin (B) is finely dispersed in the polycarbonate resin (A). Consequently, impact resistance can be more effectively improved.

As the flexible styrene-based resin to which functional groups having polarity have been imparted, it is preferred to use a modification of an SEBS or SEPS. Specific examples thereof include SEBSs modified with maleic anhydride, SEPSs modified with maleic anhydride, epoxy-modified SEBSs, and epoxy-modified SEPSs. Specific examples of the merchandise include "Tuftec M" series, manufactured by Asahi Kasei Chemicals Corp., "Dynaron" series, manufactured by JSR Co., Ltd., and "Epofriend" series, manufactured by Dicel Chemical Industries, Ltd.

The flexible styrene-based resin (B) has a melt flow rate (MFR), as measured at 230° C. under a load of 2.16 kg, of preferably 1-10 g/10 min. The lower limit of the MFR thereof is more preferably 2 g/10 min, even more preferably 4 g/10 min. The upper limit of the MFR thereof is more preferably 8 g/10 min, even more preferably 6 g/10 min. So long as the MFR of the flexible styrene-based resin (B) is within that range, this resin (B) shows satisfactory dispersibility in the polycarbonate resin (A) and a resin composition excellent in terms of transparency and impact resistance can be provided.

It is important that the proportion of the flexible styrene-based resin (B) to the mixture (X) in the third aspect of the invention should be 1-20% by mass. The lower limit thereof is more preferably 3% by mass, even more preferably 5% by mass. The upper limit thereof is more preferably 18% by mass, even more preferably 15% by mass. When the proportion of the flexible styrene-based resin (B) to the mixture (X) is lower than that range, there are the cases where the effect of improving impact resistance is insufficient. On the other hand, when the proportion of the flexible styrene-based resin (B) exceeds that range, there are the cases where the resin composition is excessively softened, resulting in reduced heat resistance.

The difference between the average refractive index of the polycarbonate resin (A) and the average refractive index of the flexible styrene-based resin (B) ([average refractive index of (A)]−[average refractive index of (B)]) is preferably from −0.015 to +0.015, more preferably from −0.013 to +0.013, even more preferably from −0.010 to +0.010. So long as the difference in average refractive index between the polycarbonate resin (A) and the flexible styrene-based resin (B) is within that range, it is possible to provide a resin composition which is excellent especially in terms of transparency.

The average refractive index of the polycarbonate resin (A) and that of the flexible styrene-based resin (B) were calculated using the following method.

Samples which had been molded in a thickness of 100 µm were examined with an Abbe refractometer manufactured by Atago Co., Ltd., at an ambient temperature of 23° C. using sodium D-line (589 nm) in accordance with JIS K7142 (2008). The number of the samples thus examined was 5, and an average of the refractive index values thereof was calculated as the average refractive index.

<Heat Stabilizer>

A heat stabilizer can be incorporated into the resin composition according to the third aspect of the invention in order to prevent a decrease in molecular weight or a deterioration in hue from occurring during molding. Techniques concerning the use of a heat stabilizer are the same as in the polycarbonate resin composition according to the first aspect of the invention.

<Antioxidant>

A generally known antioxidant can be incorporated into the resin composition according to the third aspect of the invention for purpose of preventing oxidation. Techniques concerning the use of an antioxidant are the same as in the polycarbonate resin composition according to the first aspect of the invention.

<Lubricant>

A lubricant can be incorporated into the resin composition according to the third aspect of the invention for the purpose of imparting surface lubricity. Examples of the lubricant include higher fatty acid esters of mono- or polyhydric alcohols, higher fatty acids, paraffin waxes, bees wax, olefin waxes, olefin waxes containing carboxy groups and/or carboxylic anhydride groups, silicone oils, and organopolysiloxanes.

Techniques concerning the use of the higher fatty acid esters are the same as in the polycarbonate resin composition according to the first aspect of the invention.

<Ultraviolet Absorber or Light Stabilizer>

An ultraviolet absorber or a light stabilizer can be incorporated for the purpose of further improving the weatherability of the resin composition according to the third aspect of the invention. Techniques concerning the use of an ultraviolet absorber or light stabilizer are the same as in the polycarbonate resin composition according to the first aspect of the invention.

<Epoxy Compound>

Furthermore, an epoxy compound can be incorporated in order to further improve the hydrolytic resistance of the resin composition according to the third aspect of the invention. Examples of the epoxy compound include epoxidized soybean oil, epoxidized linseed oil, phenyl glycidyl ether, allyl glycidyl ether, t-butylphenyl glycidyl ether, 3,4-epoxycyclohexylmethyl-3',4'-epoxycyclohexylcarboxylate, 3,4-epoxy-6-methylcyclohexylmethyl-3',4'-epoxy-6'-methylcyclohexylcarboxylate, 2,3-epoxycyclohexylmethyl-3',4'-epoxycyclohexylcarboxylate, 4-(3,4-epoxy-5-methylcyclohexyl)butyl-3',4'-epoxycyclohexylcarboxylate, 3,4-epoxycyclohexylethylene oxide, cyclohexylmethyl 3,4-epoxycyclohexylcarboxylate, 3,4-epoxy-6-methylcyclohexylmethyl-6'-methylcyclohexylcarboxylate, bisphenol A diglycidyl ether, tetrabromobisphenol A glycidyl ether, the diglycidyl ester of phthalic acid, the diglycidyl ester of hexahydrophthalic acid, bis(epoxydicyclopentadienyl)ether, bis-epoxyethylene glycol, bis(epoxycyclohexyl) adipate, butadiene diepoxide, tetraphenylethylene epoxide, octyl epoxytallate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexylcarboxylate, N-butyl-2,2-dimethyl-3,4-epoxycyclohexylcarboxylate, cyclohexyl-2-methyl-3,4-epoxycyclohexylcarboxylate, N-butyl-2-isopropyl-3,4-epoxy-5-methylcyclohexylcarboxylate, octadecyl-3,4-epoxycyclohexylcarboxylate, 2-ethylhexyl-3',4'-epoxycyclohexylcarboxylate, 4,6-dimethyl-2,3-epoxycyclohexyl-3',4'-epoxycyclohexylcarboxylate, 4,5-epoxytetrahydrophthalic anhydride, 3-t-butyl-4,5-epoxytetrahydrophthalic anhydride, diethyl-4,5-epoxy-cis-1,2-cyclohexyldicarboxylate, and di-N-butyl-3-t-butyl-4,5-epoxy-cis-1,2-cyclohexyldicarboxylate. Bisphenol A diglycidyl ether is preferred from the standpoints of compatibility, etc. The amount of the epoxy compound to be incorporated per 100 parts by mass of the resin composition according to the third aspect of the invention is preferably 0.0001-5 parts by mass, more preferably 0.001-1 part by mass, even more preferably 0.005-0.5 parts by mass. By incorporating an epoxy compound in an amount within that range, the hydrolytic resistance of the resin composition can be improved while preventing the epoxy compound from bleeding and while preventing various molded articles of the resin composition from having reduced mechanical properties.

Additives such as, for example, a plasticizer, pigment, dye, and filler can be further incorporated, besides the additives described above, into the resin composition according to the third aspect of the invention.

In the case where the resin composition according to the third aspect of the invention is molded in a thickness of 0.1 mm, this molded article has a haze, as measured in accordance with JIS K7105 (1981), of preferably 10% or less, more preferably 8% or less, even more preferably 5% or less. When the haze thereof is within that range, this resin composition can be extensively used in various applications where transparent is required.

<Applications of the Resin Composition>

The resin composition according to the third aspect of the invention can be molded into films, plates, injection-molded articles, or the like. Examples include: a method in which raw materials including the polycarbonate resin (A) and the flexible styrene-based resin (B) and optionally further including other resins, additives, etc. are directly mixed together and this mixture is introduced into an extruder or injection molding machine and molded; and a method in which the raw materials are melt-mixed using a twin-screw extruder and extruded into a strand form to produce pellets and the pellets are thereafter introduced into an extruder or injection molding machine and molded. In either method, it is necessary to take account of a decrease in the molecular weight of the polycarbonate resin due to hydrolysis. From the standpoint of evenly mixing the raw materials, it is preferred to select the latter method. The latter production method is hence explained below.

The polycarbonate resin (A), the flexible styrene-based resin (B), and optional ingredients, such as other resins and additives, are sufficiently dried to remove the moisture and then melt-mixed using a twin-screw extruder, and the mixture is extruded into a strand form to produce pellets. In this operation, it is preferred to suitably select a melt extrusion temperature while taking account, for example, of the fact that the viscosity changes depending on the composition of each raw material and on the proportions of the raw materials. Specifically, the molding temperature is preferably 200-260° C., more preferably 210-250° C., even more preferably 220-240° C.

The pellets produced by the method described above are sufficiently dried to remove the moisture. Thereafter, the pellets can be molded into a film, plate, or injection-molded article by the following method.

For the film and plate molding, use can be made of roll stretching, tenter stretching, a tubular method, or an inflation method. Also usable, besides these, are general techniques for film or plate molding, such as a T-die casting method and a pressing method.

In general, the term "film" means a thin and flat product which has a thickness that is exceedingly small as compared with the length and width thereof, the maximum thickness thereof having been limited at will, and which usually is supplied in the form of a roll (JIS K6900). The term "sheet" generally means a flat product which is thin and has a thickness that is small for the length and width thereof, according to the definition given in the JIS. However, there is no clear boundary between the sheet and the film, and there is no need of using terms for discriminating the two in the third aspect of the invention. Consequently, in the third aspect of the invention, the term "film" means any of products which include "sheets", while the term "sheet" means any of products which include "films".

Methods for forming the injection-molded article are not particularly limited. For example, use can be made of injection molding techniques such as general techniques for injection-molding thermoplastic resins, gas-assisted molding, and injection compression molding. Also usable besides these techniques, according to purposes, are in-mold molding, gas-pressing molding, two-color molding, sandwich molding, etc.

The film, plate, or injection-molded article obtained from the resin composition according to the third aspect of the invention is excellent in terms of transparency, heat resistance, and impact resistance. Consequently, although applications of the resin composition according to the third aspect of the invention are not particularly limited, this resin composition can be used, for example, in applications such as building materials, interior parts, transparent films, films for resin-coated metal sheets, films to be subjected to forming (vacuum/air-pressure forming, hot-press forming, etc.), colored plates, transparent plates, shrink films, shrink labels, shrink tubes, and injection-molded articles such as automotive interior materials, the housings of domestic electrical appliances, various parts, and parts for OA appliances.

EXAMPLES

The first aspect of the invention will be explained below in more detail by reference to Examples. However, the first aspect of the invention should not be construed as being limited by the following Examples unless the first aspect departs from the essential points thereof.

In the following, properties of the polycarbonate resin compositions and molded articles were evaluated by the following methods.

(1) Method for Test Piece Production

Pellets of a polycarbonate resin composition were dried at 80° C. for 6 hours using a hot-air drying oven. Subsequently, the dried polycarbonate resin composition pellets were fed to an injection molding machine (Type J75EII, manufactured by The Japan Steel Works, Ltd.) to mold injection-molded plates (60 mm (width)×60 mm (length)×3 mm (thickness)) and ISO test pieces for mechanical property evaluation under the conditions of a resin temperature of 240° C., mold temperature of 60° C., and molding cycle of 40 seconds.

(2) Measurement of Total Light Transmittance and Haze

The injection-molded plates obtained in (1) above were examined for total light transmittance and haze using a hazeometer (NDH 2000, manufactured by Nippon Denshoku Kogyo K.K.) and illuminant D65 in accordance with JIS K7105 (1981).

(3) Notched Charpy Impact Strength

The ISO test pieces for mechanical property evaluation obtained in (1) above were subjected to a notched Charpy impact test in accordance with ISO 179 (2000).

(4) Glass Transition Temperature

Using a differential scanning calorimeter ("DSC 220", manufactured by SII Nano Technology Inc.), about 10 mg of a polycarbonate resin was heated at a heating rate of 10° C./min to determine a DSC curve. Subsequently, in accordance with JIS-K7121 (1987), the temperature corresponding to the intersection of the straight line drawn by extending the lower-temperature-side base line toward the higher-temperature side and the tangent which touched the stepwise changing part due to a glass transition at the point where the curve had a maximum slope was determined as an extrapolated glass transition initiation temperature. This temperature was taken as the glass transition temperature.

(5) Reduced Viscosity

Pellets of a polycarbonate resin were dissolved using a methylene chloride solvent to prepare a polycarbonate solution having a concentration of 0.6 g/dL. Subsequently, using an Ubbelohde viscometer manufactured by Moritomo Rika Kogyo, a measurement was made at a temperature of 20.0±0.1° C. The relative viscosity $\eta_{rel}$ was calculated from the flow-down time of the solvent $t_0$ and the flow-down time of the solution t using the following equation ($\alpha$). The specific viscosity $\eta_{sp}$ was calculated from the relative viscosity $\eta_{rel}$ using the following equation ($\beta$). Symbol $\eta_0$ in equation ($\beta$) is the viscosity of the solvent.

$$\eta_{rel}=t/t_0 \qquad (\alpha)$$

$$\eta_{sp}=(\eta-\eta_0)/\eta_0=\eta_{rel}-1 \qquad (3)$$

The specific viscosity $\eta_{sp}$ was divided by the concentration of the polycarbonate solution c (g/dL) to calculate the reduced viscosity $\eta$ ($\eta=\eta_{sp}/c$). The larger the value thereof, the higher the molecular weight.

(6) Melt Viscosity

Using Capirograph, manufactured by Toyo Seiki Ltd., measurements were made under the conditions of a die length of 10.0 mm, die diameter of 1.0 mm, and melt temperature of 240° C. while changing the shear rate at will. The melt viscosity at a shear rate of 600 sec$^{-1}$ was read out of the melt viscosity curve obtained.

The following abbreviations for compounds were used in the following description of Examples.

ISB: isosorbide (trade name POLYSORB, manufactured by Roquette Freres)

CHDM: 1,4-cyclohexanedimethanol (manufactured by Eastman Co.)

DPC: diphenyl carbonate (manufactured by Mitsubishi Chemical Corp.)

(Impact Strength Modifiers)

Metablen C-223A: MBS (manufactured by Mitsubishi Rayon Co., Ltd.)

Paraloid EXL 2603: butadiene/alkyl acrylate/alkyl methacrylate copolymer (manufactured by Rohm & Hass Japan K.K.)

(Antioxidants)

ADK STAB 2112: phosphite-based antioxidant (manufactured by ADEKA Corp.)

ADK STAB AO-60: phenolic antioxidant (manufactured by ADEKA Corp.)

(Release Agent)

S-100A: stearic monoglyceride (manufactured by Riken Vitamin Co., Ltd.)

Example A1

Into a polymerization reactor equipped with a stirrer and a reflux condenser regulated so as to have a temperature of 100° C. were introduced ISB, CHDM, DPC which had been purified by distillation to a chloride ion concentration of 10 ppb or less, and calcium acetate monohydrate so that the ISB/CHDM/DPC/calcium acetate monohydrate molar ratio was 0.50/0.50/1.00/1.3×10$^{-6}$. Nitrogen displacement was sufficiently conducted (oxygen concentration, 0.0005-0.001 vol %).

Subsequently, the contents were heated with a heat medium, and stirring was initiated at the time when the internal temperature reached 100° C. While regulating the system so as to maintain the internal temperature of 100° C., the contents were melted and homogenized. Thereafter, heating was initiated to elevate the internal temperature to 210° C. over 40 minutes. At the time when the internal temperature reached 210° C., the system was regulated so as to maintain the temperature and, simultaneously therewith, pressure reduction was initiated. The pressure was reduced to 13.3 kPa (absolute pressure; the same applies hereinafter) over 90 minutes after the temperature of 210° C. had been reached, and the contents were held for further 60 minutes while maintaining the pressure.

The phenol vapor which generated as a by-product with the progress of the polymerization reaction was introduced into the reflux condenser, in which steam regulated so as to have a temperature of 100° C. at the inlet of the reflux condenser was used as a coolant, and the monomer ingredients contained in a small amount in the phenol vapor were returned to the polymerization reactor. The phenol vapor, which remained uncondensed, was subsequently introduced into a condenser that employed 45° C. warm water as a coolant, and recovered.

The contents which had been thus oligomerized were temporarily returned to atmospheric pressure and then transferred to another polymerization reactor equipped with a stirrer and a reflux condenser regulated in the same manner as described above. Heating and pressure reduction were initiated, and the internal temperature and the pressure were changed to 220° C. and 200 Pa, respectively, over 60 minutes. Thereafter, the internal temperature and the pressure were changed to 230° C. and 133 Pa or lower, respectively, over 20 minutes. At the time when a given stirring power had been reached, the pressure was returned to atmospheric pressure, and the contents were discharged in the form of a strand and cut into pellets (polycarbonate resin) with a rotary cutter.

Subsequently, using a twin-screw extruder having two vent holes (LABOTEX 30HSS-32) manufactured by The Japan Steel Works, Ltd., the polycarbonate resin pellets obtained were mixed with Metablen C-223A as an impact strength modifier, 5-100A as a release agent, and ADK STAB AO-60 and ADK STAB 2112 as antioxidants so as to result in the recipe shown in the following Table 1, and the mixture was extruded into a strand form at an outlet resin temperature of 250° C. The extrudate was solidified by water cooling and then pelletized with a rotary cutter. In this operation, the vent holes were kept connected to a vacuum pump, and the extruder was regulated so as to have a pressure of 500 Pa at the vent holes. The pellet-form polycarbonate resin composition obtained was analyzed. The results thereof and the results of the evaluation of the composition made by the methods described above are shown in the following Table 1.

Example A2

The same procedure as in Example A1 was conducted, except that Paraloid EXL 2603 was added as an impact strength modifier in an amount of 5 parts by weight.

Example A3

The same procedure as in Example A1 was conducted, except that the molar proportions of ISB and CHDM in Example A1 were changed and that 10 parts by weight of Metablen C-223A was added as an impact strength modifier.

Comparative Example A1

The same procedure as in Example A1 was conducted, except that the impact strength modifier used in Example A1 was omitted.

Comparative Example A2

The same procedure as in Example A3 was conducted, except that the impact strength modifier used in Example A3 was omitted.

TABLE 1

|  |  |  | Example A1 | Example A2 | Example A3 | Comparative Example A1 | Comparative Example A2 |
|---|---|---|---|---|---|---|---|
| Polycarbonate resin | Proportion of structural units derived from dihydroxy compound | ISB<br>CHDM | mol % | 50.0<br>50.0 | 50.0<br>50.0 | 69.9<br>30.1 | 50.0<br>50.0 | 69.9<br>30.1 |
|  | Glass transition temperature |  | °C. | 99 | 99 | 124 | 99 | 124 |
|  | Reduced viscosity |  | dL/g | 0.60 | 0.60 | 0.48 | 0.60 | 0.48 |
| Impact strength modifier | C-223A (MBS) |  | parts by weight | 5.0 | — | 10.0 | — | — |
|  | EXL 2603 (butadiene/acrylic) |  | parts by weight | — | 5.0 | — | — | — |
| Release agent | S100A |  | parts by weight | 0.3 | 0.3 | 0.3 | 0.3 | 0.3 |
| Antioxidant | AO-60 (phenolic) |  | parts by weight | 0.1 | 0.1 | 0.1 | 0.1 | 0.1 |
|  | 2112 (phosphite-based) |  | parts by weight | 0.05 | 0.05 | 0.05 | 0.05 | 0.05 |
| Polycarbonate resin composition | Melt viscosity |  | Pa·s | 604 | 565 | 640 | 559 | 547 |
| Molded article | Total light transmittance |  | % | 73 | 83 | 63 | 90 | 89 |
|  | Haze |  | % | 59 | 9 | 84 | 2 | 2 |
|  | Notched Charpy strength |  | kJ/m² | 131 | 29 | 49 | 12 | 7 |

As can be seen from Table 1, the compositions of Examples A1 to A3 showed a total light transmittance as high as 60% or above and a high notched Charpy impact strength as compared with Comparative Examples A1 and A2. Consequently, the molded polycarbonate resin articles of Examples A1 to A3 combine excellent transparency and impact strength, and are suitable for use in the field of building materials, electrical/electronic field, automotive field, field of optical parts, etc.

The second aspect of the invention is explained below in more detail by reference to Examples. However, the second aspect of the invention should not be construed as being limited to the following Examples unless the second aspect departs from the essential points thereof. Incidentally, the values of various production conditions and evaluation results which are given in the following Examples mean preferred values of the upper limits or lower limits for embodiments of the invention, and preferred ranges may be ranges each specified by a combination of the upper-limit or lower-limit value shown above and either the value used or obtained in any of the Examples or the values used or obtained in Examples.

In the following, starting materials and additives used for producing polycarbonate resins and polycarbonate resin compositions are expressed by the following abbreviations.

ISB: isosorbide
TCDDM: tricyclodecanedimethanol
CHDM: 1,4-hexanedimethanol
DPC: diphenyl carbonate
C-223A: "Metablen C-223A", manufactured by Mitsubishi Rayon Co., Ltd. (an elastomer constituted of a core/shell type graft copolymer in which the core layers are a butadiene/styrene copolymer and the shell layers are methyl methacrylate)
EXL 2603: "Paraloid EXL 2603", manufactured by Rohm & Hass Co. (an elastomer constituted of a core/shell type graft copolymer in which the core layers are a butadiene polymer and the shell layers are an alkyl alkylate/alkyl methacrylate copolymer)
AS 2112: "ADK STAB 2112", manufactured by ADEKA Corp. (phosphite-based antioxidant)
IRGANOX 1010: "IRGANOX 1010", manufactured by BASF Japan Ltd. (hindered-phenol antioxidant)
E-275: "Unister E-275", manufactured by NOF Corp. (glycol distearate)
S-100A: "S-100A", manufactured by Riken Vitamin Co., Ltd. (stearic monoglyceride)

Properties of polycarbonate resins and properties of polycarbonate resin compositions were examined and evaluated by the following methods.

[Properties of Polycarbonate Resin]
1) Measurement of Glass Transition Temperature (Tig)

Using a differential scanning calorimeter ("DSC 220", manufactured by SII Nano Technology Inc.), about 10 mg of a polycarbonate resin was heated at a heating rate of 10° C./min to determine a DSC curve. Subsequently, in accordance with JIS-K7121 (1987), the temperature corresponding to the intersection of the straight line drawn by extending the lower-temperature-side base line toward the higher-temperature side and the tangent which touched the stepwise changing part due to a glass transition at the point where the curve had a maximum slope was determined as an extrapolated glass transition initiation temperature. This temperature was taken as the glass transition temperature.

2) Measurement of Reduced Viscosity

A polycarbonate resin was dissolved using methylene chloride as a solvent to prepare a polycarbonate resin solution having a concentration of 0.6 g/dL. Using an Ubbelohde viscometer manufactured by Moritomo Rika Kogyo, a measurement was made at a temperature of 20.0±0.1° C. The relative viscosity $\eta_{rel}$ was determined from the flow-down time of the solvent $t_0$ and the flow-down time of the solution t using the following equation (i). The specific viscosity $\eta_{sp}$ was determined from the relative viscosity using the following equation (ii).

$$\eta_{rel} = t/t_0 \qquad (i)$$

$$\eta_{sp} = (\eta - \eta_0)/\eta_0 = \eta_{rel} - 1 \qquad (ii)$$

The specific viscosity was divided by the concentration c (g/dL) to calculate the reduced viscosity $\eta_{sp}/c$.

The larger the value thereof, the higher the molecular weight.

[Properties of Polycarbonate Resin Composition]
1) Evaluation of Strain at Rupture Strain at rupture was measured by the tensile test method according to ISO 527 (1993). The larger the value of strain at rupture, the better the composition.

2) Evaluation of Nominal Strain at Rupture

Nominal strain at rupture was measured by the tensile test method according to ISO 527 (1993). The larger the value of nominal strain at rupture, the better the composition.

3) Evaluation of Percent Brittle Fracture

Using a Du Pont drop impact tester, a weight was caused to fall from a given height onto a molded piece having dimensions of 1 mm (thickness)×100 mm×100 mm in an atmosphere having a temperature of 23° C. The molded piece was examined for the mode of rupture. Thereafter, the percent brittle fracture was determined. The smaller the value of percent brittle fracture, the better the molded piece.

Production Example 1

Into a polymerization reactor equipped with a stirrer and a reflux condenser regulated so as to have a temperature of 100° C. were introduced ISB, TCDDM, DPC which had been purified by distillation to a chloride ion concentration of 10 ppb or less, and calcium acetate monohydrate so that the ISB/TCDDM/DPC/calcium acetate monohydrate molar ratio was 0.50/0.50/1.00/1.3×10$^{-6}$. Nitrogen displacement was sufficiently conducted (oxygen concentration, 0.0005-0.001 vol %).

Subsequently, the contents were heated with a heat medium, and stirring was initiated at the time when the internal temperature reached 100° C. While regulating the system so as to maintain the internal temperature of 100° C., the contents were melted and homogenized. Thereafter, heating was initiated to elevate the internal temperature to 210° C. over 40 minutes. At the time when the internal temperature reached 210° C., the system was regulated so as to maintain the temperature and, simultaneously therewith, pressure reduction was initiated. The pressure was reduced to 13.3 kPa (absolute pressure; the same applies hereinafter) over 90 minutes after the temperature of 210° C. had been reached, and the contents were held for further 60 minutes while maintaining the pressure.

The phenol vapor which generated as a by-product with the progress of the polymerization reaction was introduced into the reflux condenser, in which steam regulated so as to have a temperature of 100° C. at the inlet of the reflux condenser was used as a coolant, and the monomer ingredients contained in a small amount in the phenol vapor were returned to the polymerization reactor. The phenol vapor, which remained uncondensed, was subsequently introduced into a condenser that employed 45° C. warm water as a coolant, and recovered.

The contents which had been thus oligomerized were temporarily returned to atmospheric pressure and then transferred to another polymerization reactor equipped with a stirrer and a reflux condenser regulated in the same manner as described above. Heating and pressure reduction were initiated, and the internal temperature and the pressure were changed to 220° C. and 200 Pa, respectively, over 60 minutes. Thereafter, the internal temperature and the pressure were changed to 230° C. and 133 Pa or lower, respectively, over 20 minutes. At the time when a given stirring power had been reached, the pressure was returned to atmospheric pressure, and the contents were discharged in the form of a strand and cut into pellets (polycarbonate resin) with a rotary cutter.

Production Example 2

The same procedure as in Production Example 1 was conducted, except that the molar proportions of ISB and TCDDM were changed so that the ISB/TCDDM ratio was 0.70/0.30 (by mole).

Production Example 3

The same procedure as in Production Example 1 was conducted, except that the TCDDM was omitted and ISB was used as the only dihydroxy compound.

With respect to each of the polycarbonate resins obtained in Production Examples 1 to 3, the proportion of structural units derived from each dihydroxy compound to all structural units each derived from a dihydroxy compound, the glass transition temperature (Tig), and the reduced viscosity are summarized in Table 2.

TABLE 2

|  |  | Production Example 1 | Production Example 2 | Production Example 3 |
|---|---|---|---|---|
| Molar proportion of component in polycarbonate resin (mol %)* | ISB | 50 | 70 | 100 |
|  | TCDDM | 50 | 30 | 0 |
|  | CHDM | 0 | 0 | 0 |
| Glass transition temperature (Tig) | ° C. | 112 | 130 | 158 |
| Reduced viscosity | dL/g | 0.45 | 0.4 | 0.4 |

*Proportion of structural units derived from each dihydroxy compound to all structural units each derived from a dihydroxy compound, in the polycarbonate resin.

Examples B1 to B6 and Comparative Examples B1 to B5

The polycarbonate resin pellets produced in Production Examples 1 to 3 were used, and the additives shown in Tables 3 to 5 were added thereto in accordance with the recipes shown in the tables. Using a twin-screw extruder having two vent holes (LABOTEX 30HSS-32) manufactured by The Japan Steel Works, Ltd., each mixture was extruded into a strand form at an outlet resin temperature of 250° C. The extrudate was solidified by water cooling and then pelletized with a rotary cutter. In this operation, the vent holes were kept connected to a vacuum pump, and the extruder was regulated so as to have a pressure of 500 Pa at the vent holes. The pellet-form polycarbonate resin compositions obtained were evaluated by the methods described above, and the results thereof are shown in Tables 3 to 5. In Examples B1 to B6, the molded objects having a thickness of 3 mm were ascertained to have a total light transmittance of 60% or higher.

TABLE 3

|  |  |  | Comparative Example B1 | Example B1 | Example B2 | Example B3 | Example B4 |
|---|---|---|---|---|---|---|---|
| Recipe of polycarbonate resin composition (wt %) | Polycarbonate resin | Production Example 1 (ISB/TCDDM = 50/50) |  |  |  |  |  |
|  |  | Production Example 2 (ISB/TCDDM = 70/30) | 100 | 100 | 100 | 100 | 100 |
|  |  | Production Example 3 (ISB = 100) |  |  |  |  |  |

TABLE 3-continued

|  |  |  | Comparative Example B1 | Example B1 | Example B2 | Example B3 | Example B4 |
|---|---|---|---|---|---|---|---|
|  | Elastomer | C-223A |  |  |  | 2.58 | 5.29 |
|  |  | EXL 2603 |  | 2.58 | 5.29 |  |  |
|  | Anti-oxidant | AS 2112 | 0.05 | 0.05 | 0.05 | 0.05 | 0.05 |
|  |  | IRGANOX 1010 | 0.10 | 0.10 | 0.11 | 0.10 | 0.11 |
|  | Release agent | E-275 | 0.30 | 0.31 | 0.32 | 0.31 | 0.32 |
|  |  | S-100A |  |  |  |  |  |
| Evaluation results | Strain at rupture (%) |  | 8 | 30 | 27 | 43 | 82 |
|  | Nominal strain at rupture (%) |  | 19 | 41 | 43 | 44 | 71 |
|  | Percent brittle fracture (%) |  | 100 | 55 | 30 | 40 | 11 |

*1 In the table, each blank indicates that the material was not used.

TABLE 4

|  |  |  | Comparative Example B2 | Example B5 | Example B6 |
|---|---|---|---|---|---|
| Recipe of polycarbonate resin composition (wt %) | Polycarbonate resin | Production Example 1 (ISB/TCDDM = 50/50) | 100 | 100 | 100 |
|  |  | Production Example 2 (ISB/TCDDM = 70/30) |  |  |  |
|  |  | Production Example 3 (ISB = 100) |  |  |  |
|  | Elastomer | C-223A |  | 11.17 |  |
|  |  | EXL 2603 |  |  | 11.17 |
|  | Antioxidant | AS 2112 | 0.05 | 0.06 | 0.06 |
|  |  | IRGANOX 1010 | 0.10 | 0.11 | 0.11 |
|  | Release agent | E-275 | 0.30 | 0.34 | 0.34 |
|  |  | S-100A |  |  |  |
| Evaluation results | Strain at rupture (%) |  | 13 | 20 | 37 |
|  | Nominal strain at rupture (%) |  | 12 | 20 | 28 |
|  | Percent brittle fracture (%) |  | 89 | 18 | 10 |

*1 In the table, each blank indicates that the material was not used.

TABLE 5

|  |  |  | Comparative Example B3 | Comparative Example B4 | Comparative Example B5 |
|---|---|---|---|---|---|
| Recipe of polycarbonate resin composition (wt %) | Polycarbonate resin | Production Example 1 (ISB/TCDDM = 50/50) |  |  |  |
|  |  | Production Example 2 (ISB/TCDDM = 70/30) |  |  |  |
|  |  | Production Example 3 (ISB = 100) | 100 | 100 | 100 |
|  | Elastomer | C-223A |  |  | 5.29 |
|  |  | EXL 2603 |  | 5.29 |  |
|  | Antioxidant | AS 2112 | 0.05 | 0.05 | 0.05 |
|  |  | IRGANOX 1010 | 0.10 | 0.11 | 0.11 |
|  | Release agent | E-275 | 0.30 | 0.32 | 0.32 |
|  |  | S-100A |  |  |  |
| Evaluation results | Strain at rupture (%) |  | 8 | 10 | 10 |
|  | Nominal strain at rupture (%) |  | 11 | 14 | 15 |
|  | Percent brittle fracture (%) |  | 100 | 100 | 100 |

*1 In the table, each blank indicates that the material was not used.

It can be seen from the results given above that molded polycarbonate resin articles which are excellent in terms of sheet impact resistance, impact resistance, etc. are obtained from the polycarbonate resin compositions according to the second aspect of the invention. With respect to Examples B1 to B6, the molded objects having a thickness of 3 mm were ascertained to have a total light transmittance of 60% or higher.

Examples of the third aspect of the invention are shown below. However, the third aspect of the invention is not limited by the following Examples in any way.

The various examinations and evaluation of raw materials and test pieces which are shown in this description were conducted in the following manners. Here, the direction in which a film runs from the extruder is called machine direction, and the direction which is perpendicular thereto is called transverse direction.

(1) Haze

In accordance with JIS K7105 (1981), total light transmittance and diffuse transmittance were measured and the haze was calculated using the following equation. The test pieces which had a haze of 10% or less when the thickness thereof was 0.1 mm were rated as acceptable.

[Haze]=[diffuse transmittance]/[total light transmittance]×100

(2) Tensile Strength/Elongation at Rupture

In accordance with JIS K7127 (1999), a test piece was examined in the machine direction under the conditions of a temperature of 23° C. and a test speed of 200 mm/min. The test pieces which had a tensile strength at rupture of 50 MPa or higher and a tensile elongation at rupture of 100% or higher were rated as acceptable.

(3) Fracture Energy

High-speed impact tester Hydroshot ("Type HTM-1", manufactured by Shimadzu Corp.) was used. A sheet which had been cut out into a size of 100 mm (machine direction)×100 mm (transverse direction)×0.1 mm (thickness) was used as a sample and fixed with the clamp. At a temperature of 23° C., an impactor having a diameter of ½ inch was caused to fall onto the center of the sheet at a falling speed of 3 msec to impact on the sheet, and the fracture energy (kgf·mm) at which the sample ruptured was measured. The samples which had a fracture energy of 50 kgf·mm or higher were rated as acceptable.

(4) TMA Softening Temperature

A sample to be evaluated which had a size of 5 mm (length)×5 mm (width)×0.1 mm (thickness) was used and examined for softening temperature by TMA in accordance with JIS K7196 (1991). The sample was examined at an ambient temperature of 23° C., relative humidity of 50%, pressure applied to the indenter of 0.5 N, and heating rate of 5° C./min to obtain a TMA curve. The linear portion which was seen on the lower-temperature side of the temperature at which the indenter began to penetrate was extended toward the higher-temperature side, and a tangent which touched the curve at the point where the penetration rate was maximum was drawn and extended toward the lower-temperature side. The intersection of these two extensions was taken as a needle penetration temperature, and the softening temperature was calculated from the value thereof. The samples which had a TMA softening temperature of 70° C. or higher were rated as acceptable.

(5) Difference in Average Refractive Index

Each of the materials used in the Examples and Comparative Examples was molded into a thickness of 100 μm. These samples were examined with an Abbe refractometer manufactured by Atago Co., Ltd., at an ambient temperature of 23° C. using sodium D-line (589 nm) in accordance with JIS K7142 (2008). The number of samples of each material thus examined was 5, and an average of the refractive index values thereof was calculated as the average refractive index. The difference between the average refractive index of the polycarbonate resin (A) and the average refractive index of the flexible styrene-based resin (B) (or of the resin used in place of (B)) ([average refractive index of (A)]−[average refractive index of (B)]) was calculated. The compositions in which the difference in average refractive index was from −0.015 to +0.015 were rated as acceptable. Incidentally, the case where (A) had been used alone or the case where the average refractive index of one resin was unable to be measured is expressed by "−" in Table 6.

[Polycarbonate Resin (A)]

<PC1>

[Structural units derived from isosorbide]/[structural units derived from 1,4-cyclohexanedimethanol]=70/30 mol %

(Glass transition temperature=120° C.; reduced viscosity=0.56 dL/g; average refractive index=1.500)

<PC2>

[Structural units derived from isosorbide]/[structural units derived from 1,4-cyclohexanedimethanol]=50/50 mol %

(Glass transition temperature=101° C.; reduced viscosity=0.57 dL/g; average refractive index=1.501)

[Flexible Styrene-Based Resin (B)]

<TPS1>

Tuftec H1052, manufactured by Asahi Kasei Chemicals Corp.

(SEBS; styrene content=20 mass %; average refractive index=1.508; MFR=5.0 g/10 min)

<TPS2>

Tuftec M1913, manufactured by Asahi Kasei Chemicals Corp.

(SEBS modified with maleic anhydride; styrene content=30 mass %; average refractive index=1.511; MFR=5.0 g/10 min; acid value=10 mg-$CH_3ONa$/g)

<TPS3>

Tuftec M1943, manufactured by Asahi Kasei Chemicals Corp.

(SEBS modified with maleic anhydride; styrene content=20 mass %; average refractive index=1.498; MFR=8.0 g/10 min; acid value=10 mg-$CH_3ONa$/g)<

<TPS4>

Tuftec H1051, manufactured by Asahi Kasei Chemicals Corp.

(SEBS; styrene content=42 mass %; average refractive index=1.520; MFR=0.8 g/10 min)

Example C1

PC1 was dry-blended with TPS1 in a ratio of 95:5 by mass. The resultant mixture was kneaded at 220° C. using a corotating twin-screw extruder having a diameter of 40 mm, subsequently extruded through a T-die, and then rapidly cooled with a casting roll having a temperature of about 120° C. to produce a film having a thickness of 0.1 mm. The film obtained was evaluated for haze, tensile strength/elongation at rupture, fracture energy, and TMA softening temperature. The results thereof are shown in Table 6.

Example C2

A film was produced and evaluated in the same manners as in Example C1, except that PC1 was dry-blended with TPS1 in a ratio of 90:10 by mass. The results thereof are shown in Table 6.

Example C3

A film was produced and evaluated in the same manners as in Example C1, except that PC1 was dry-blended with TPS2 in a ratio of 85:15 by mass. The results thereof are shown in Table 6.

Example C4

A film was produced and evaluated in the same manners as in Example C1, except that PC1 was dry-blended with TPS3 in a ratio of 80:20 by mass. The results thereof are shown in Table 6.

Example C5

A film was produced and evaluated in the same manners as in Example C1, except that PC2 was dry-blended with TPS3 in a ratio of 90:10 by mass. The results thereof are shown in Table 6.

Comparative Example C1

A film was produced and evaluated in the same manners as in Example C1, except that PC1 was used alone. The results thereof are shown in Table 6.

Example C6

A film was produced and evaluated in the same manners as in Example C1, except that PC1 was dry-blended with TPS4 in a ratio of 90:10 by mass. The results thereof are shown in Table 6.

Example C7

A film was produced and evaluated in the same manners as in Example C1, except that Techno ABS 110, manufactured by Techno Polymer Co., Ltd. (ABS resin; MFR (220° C., 10-kg load)=22 g/10 min), was used in place of the flexible styrene-based resin (B) and that PC1 was dry-blended with the Techno ABS 110 in a ratio of 90:10 by mass. The results thereof are shown in Table 6.

Example C8

A film was produced and evaluated in the same manners as in Example C1, except that Metablen S2006, manufactured by Mitsubishi Rayon Co., Ltd. (silicone/acrylic composite rubber; average refractive index=1.464), was used in place of the flexible styrene-based resin (B) and that PC1 was dry-blended with the Metablen S2006 in a ratio of 90:10 by mass. The results thereof are shown in Table 6.

Example C9

A film was produced and evaluated in the same manners as in Example C1, except that PC1 was dry-blended with TPS1 in a ratio of 70:30 by mass. The results thereof are shown in Table 6.

TABLE 6

| | | Recipe of resin composition and results of film evaluation | | | | | | | | | |
|---|---|---|---|---|---|---|---|---|---|---|---|
| | | Example C1 | Example C2 | Example C3 | Example C4 | Example C5 | Comparative Example C1 | Example C6 | Example C7 | Example C8 | Example C9 |
| (A) | PC1 | 95 | 90 | 85 | 80 | | 100 | 90 | 90 | 90 | 70 |
| | PC2 | | | | | 90 | | | | | |
| (B) | TBS1 | 5 | 10 | | | | | | | | 30 |
| | TBS2 | | | 15 | | | | | | | |
| | TBS3 | | | | 20 | 10 | | | | | |
| | TBS4 | | | | | | | 10 | | | |
| | ABS | | | | | | | | 10 | | |
| | S2006 | | | | | | | | | 10 | |
| Difference in average refractive index | | −0.008 | −0.008 | −0.011 | +0.002 | +0.003 | — | −0.020 | — | +0.036 | −0.008 |
| Haze (%) | | 2.1 | 3.2 | 4.4 | 3.8 | 2.2 | 1.1 | 8.8 | 19.6 | 16.8 | 4.6 |
| Tensile strenth at rupture (MPa) | | 66 | 67 | 64 | 59 | 58 | 75 | 61 | 58 | 65 | 46 |
| Tensile elongation at rupture (%) | | 114 | 74 | 187 | 146 | 164 | 31 | 37 | 35 | 56 | 244 |
| TMA softening temperature (° C.) | | 112 | 106 | 100 | 96 | 107 | 117 | 106 | 105 | 108 | 78 |

In the table, each blank indicates that the material was not used.

As apparent from Table 6, the films produced using the resin compositions according to the recipes of Examples C1 to C5 each had excellent transparency, impact resistance, and heat resistance. Furthermore, with respect to Examples C1 to C9, the molded objects having a thickness of 3 mm were ascertained to have a total light transmittance of 60% or higher. On the other hand, the film produced using the resin composition according to the recipe of Comparative Example C1 was inferior to the Examples in at least one of transparency, impact resistance, and heat resistance.

It can be seen from these results that the resin compositions of the invention are resin compositions which are excellent in terms of all of transparency, impact resistance, and heat resistance.

While the invention has been described in detail and with reference to specific embodiments thereof, it will be apparent to one skilled in the art that various changes and modifications can be made therein without departing from the spirit and scope thereof. This application is based on a Japanese patent application filed on Jul. 14, 2010 (Application No. 2010-159743), a Japanese patent application filed on Aug. 5, 2010 (Application No. 2010-176390), a Japanese patent application filed on Dec. 21, 2010 (Application No. 2010-284457), and a Japanese patent application filed on Mar. 31, 2011 (Application No. 2011-079417), the contents thereof being incorporated herein by reference.

INDUSTRIAL APPLICABILITY

The polycarbonate resin compositions of the invention combine excellent transparency and strength and are suitable for use in the field of building materials, electrical/electronic field, automotive field, field of optical parts, etc.

The invention claimed is:

1. A polycarbonate resin composition, comprising:
a polycarbonate resin; and
an impact strength modifier,
wherein the polycarbonate resin comprises, as a structural unit in reacted form, a dihydroxy compound comprising, as a part of the structure thereof, a portion represented by formula (1):

 (1), wherein the portion represented by formula (1) is not a —CH$_2$—O—H moiety, and wherein the dihydroxy compound has formula (2):

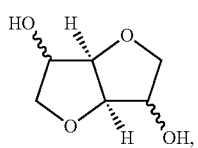 (2)

wherein the polycarbonate resin has a glass transition temperature lower than 145° C., and
wherein a molded object having a thickness of 3 mm formed from the polycarbonate resin composition has a total light transmittance of 60% or higher.

2. The polycarbonate resin composition of claim 1, wherein the impact strength modifier comprises an elastomer comprising a copolymer having a glass transition temperature of −10° C. or lower.

3. The polycarbonate resin composition of claim 2, wherein the elastomer is a thermoplastic elastomer.

4. The polycarbonate resin composition of claim 1, wherein the impact strength modifier is a copolymer comprising butadiene.

5. The polycarbonate resin composition of claim 1, comprising from 1 to 25 parts by weight of the impact strength modifier per 100 parts by weight of the polycarbonate resin.

6. A polycarbonate resin composition, comprising:
an impact strength modifier having a core/shell structure comprising a core layer and a shell layer; and
a polycarbonate resin comprising, as a structural unit in reacted form, a dihydroxy compound comprising, as a part of the structure thereof, a portion represented by formula (1):

 (1), wherein the portion represented by formula (1) is not a —CH$_2$—O—H moiety, and wherein the dihydroxy compound has formula (2):

 (2)

wherein the polycarbonate resin has a glass transition temperature lower than 145° C.

 (1).

7. The polycarbonate resin composition of claim 6, wherein the core layer of the impact strength modifier comprises an elastomer comprising a copolymer having a glass transition temperature of −10° C. or lower.

8. The polycarbonate resin composition of claim 7, wherein the elastomer is a thermoplastic elastomer.

9. The polycarbonate resin composition of claim 6, wherein the core layer of the impact strength modifier comprises at least one selected from the group consisting of an alkyl acrylate, a silicone/acrylic composite, butadiene, and a butadiene/styrene copolymer.

10. The polycarbonate resin composition of claim 6, comprising from 0.05-50 parts by weight of the impact strength modifier per 100 parts by weight of the polycarbonate resin.

11. The polycarbonate resin composition of claim 1 or claim 6, wherein the polycarbonate resin further comprises, as a structural unit in reacted form, an aliphatic dihydroxy compound.

12. The polycarbonate resin composition of claim 11, wherein the aliphatic dihydroxy compound is an alicyclic dihydroxy compound.

13. The polycarbonate resin composition of claim 11, wherein the polycarbonate resin comprises 20 mol % or more of the structural units of the aliphatic dihydroxy compound, based on all structural units of dihydroxy compounds.

14. The polycarbonate resin composition of claim 1 or claim 6, wherein the polycarbonate comprises 1-90 mol % of the structural units of the dihydroxy compound.

15. The polycarbonate resin composition of claim 1 or claim 6, wherein the polycarbonate resin has a reduced viscosity of 0.4-1.4 dL/g.

16. A polycarbonate resin composition, comprising a mixture (X) comprising:
  (A) a polycarbonate resin comprising, as a structural unit in reacted form:
    (a) a dihydroxy compound comprising, a part of the structure thereof, a portion represented by formula (1):

  (1)

wherein the portion represented by formula (1) is not a —CH$_2$—O—H moiety, and wherein the dihydroxy compound has formula (2):

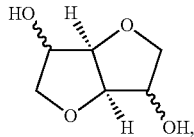  (2)

and
    (b) an alicyclic dihydroxy compound; and
  (B) from 1-20 mass %, based on a total mass of the mixture (X), of an impact strength modifier comprising a flexible styrene-comprising resin having a styrene content of 10-40% by mass.

17. The polycarbonate resin composition of claim 16, wherein the proportion of the structural units (b) to the polycarbonate resin (A) is 30-80% by mole.

18. The polycarbonate resin composition of claim 16, wherein the difference in average refractive index between the polycarbonate resin (A) and the flexible styrene-comprising resin (B) ([average refractive index of (A)]−[average refractive index of (B)]) is from −0.015 to +0.015.

19. The polycarbonate resin composition of claim 16, wherein the flexible styrene-comprising resin (B) is partly or completely hydrogenated.

20. The polycarbonate resin composition of claim 16, wherein the flexible styrene-comprising resin (B) comprises a functional group having polarity.

21. The polycarbonate resin composition of claim 20, wherein the functional group having polarity is an acid anhydride group.

22. The polycarbonate resin composition of claim 16, having a haze of 10% or less after having been molded in a thickness of 0.1 mm, the haze being measured in accordance with JIS K7105.

23. A molded polycarbonate resin article obtained by a process comprising molding the polycarbonate resin composition of claim 1.

24. The molded polycarbonate resin article of claim 23, wherein the molding is injection molding.

25. A film obtained by a process comprising molding the polycarbonate resin composition according to claim 1.

26. A plate obtained by a process comprising molding the polycarbonate resin composition according to claim 1.

* * * * *